US012613874B2

(12) United States Patent
Abbas et al.

(10) Patent No.: US 12,613,874 B2
(45) Date of Patent: Apr. 28, 2026

(54) EXECUTING QUERIES WITH HALLUCINATION SAFEGUARDS

(71) Applicant: Snowflake Inc., Menlo Park, CA (US)

(72) Inventors: Sarim Abbas, San Francisco, CA (US); Daniel Fernando Campos, Craryville, NY (US); Muhua Ngan, Foster City, CA (US); Gaurav Nuti, San Francisco, CA (US); Himabindu Pucha, Los Altos, CA (US); Danmei Xu, Santa Clara, CA (US)

(73) Assignee: Snowflake Inc., Menlo Park, CA (US)

( * ) Notice: Subject to any disclaimer, the term of this patent is extended or adjusted under 35 U.S.C. 154(b) by 0 days.

(21) Appl. No.: 19/034,022

(22) Filed: Jan. 22, 2025

(65) Prior Publication Data

US 2026/0050603 A1 Feb. 19, 2026

Related U.S. Application Data

(60) Provisional application No. 63/682,924, filed on Aug. 14, 2024.

(51) Int. Cl.
*G06F 7/00* (2006.01)
*G06F 16/242* (2019.01)
(Continued)

(52) U.S. Cl.
CPC ........ *G06F 16/2465* (2019.01); *G06F 16/243* (2019.01); *G06F 16/248* (2019.01); *G06N 20/00* (2019.01)

(58) Field of Classification Search
CPC ............. G06F 16/3347; G06F 16/3344; G06F 16/332; G06F 16/24542; G06F 16/2455;
(Continued)

(56) References Cited

U.S. PATENT DOCUMENTS

| 12,405,985 | B1 * | 9/2025 | Kanagovi | ............. | G06F 16/335 |
| 2025/0131247 | A1 * | 4/2025 | Mondlock | ............. | G06N 5/022 |

(Continued)

OTHER PUBLICATIONS

Amazon Bedrock, "ChunkingConfiguration", [Online]. Retrieved from the Internet: <https://docs.aws.amazon.com/bedrock/latest/APIReference/API_agent_ChunkingConfiguration.html>, (Accessed on Nov. 6, 2025), 3 pages.

(Continued)

*Primary Examiner* — Mohammad A Sana
(74) *Attorney, Agent, or Firm* — Schwegman Lundberg & Woessner, P.A.

(57) ABSTRACT

The described system aims to reduce or eliminate inaccuracies and hallucinations in responses generated by a machine learning model when processing user queries. The data platform parses and categorizes the text within data files to create structured textual representations. The user submits multiple prompts which are collectively assessed to refine and modify the initial queries. The modified query is used to identifying segments of data files that are most relevant to the query. These relevant portions are then compiled into a Retrieval-Augmented Generation (RAG) context block. This RAG context block is fed into a prompt response machine learning model, which processes the enriched information to generate a well-informed and accurate response to the user's query. Finally, this response is displayed back to the user through the chat interface, completing a cycle that enhances the reliability and relevance of machine-generated answers.

20 Claims, 15 Drawing Sheets

(51) Int. Cl.
|  |  |
|---|---|
| *G06F 16/2458* | (2019.01) |
| *G06F 16/248* | (2019.01) |
| *G06N 20/00* | (2019.01) |

(58) Field of Classification Search
CPC .......... G06F 16/24522; G06F 16/2456; G06F 16/2465; G06F 16/2471; G06F 16/24575; G06F 16/2453; G06F 16/2457; G06F 16/215; G06F 16/243; G06F 16/244; G06F 16/245; G06F 16/248; G06F 16/93; G06F 16/285; G06F 16/9535; G06F 16/3329; G06F 16/90332; G06F 16/90335; G06F 16/217; G06F 16/353; G06N 5/04; G06N 5/01; G06N 5/022; G06N 20/00; G06N 20/20; G06N 5/018

See application file for complete search history.

(56) References Cited

U.S. PATENT DOCUMENTS

| | | | |
|---|---|---|---|
| 2025/0173521 A1* | 5/2025 | Shimono | G06N 3/045 |
| 2025/0245446 A1* | 7/2025 | Ayed | G06F 8/35 |
| 2025/0252445 A1* | 8/2025 | Gaddam | H04L 51/02 |

OTHER PUBLICATIONS

Amazon Bedrock, "ConverseStream", [Online]. Retrieved from the Internet: <https://docs.aws.amazon.com/bedrock/latest/APIReference/API_runtime_ConverseStream.html>, (Accessed on Nov. 6, 2025), 20 pages.

Amazon Bedrock, "RetrieveAndGenerate", [Online]. Retrieved from the Internet: <https://docs.aws.amazon.com/bedrock/latest/APIReference/API_agent-runtime_RetrieveAndGenerate.html>, (Accessed on Nov. 6, 2025), 14 pages.

AWS, "AnalyzeDocument", [Online]. Retrieved from the Internet: <https://docs.aws.amazon.com/textract/latest/dg/API_AnalyzeDocument.html>, (Accessed on Nov. 6, 2025), 9 pages.

AWS, "Layout Response Objects", [Online]. Retrieved from the Internet: <https://docs.aws.amazon.com/textract/latest/dg/layoutresponse.html>, (Accessed on Nov. 6, 2025), 3 pages.

AWS, "Using Layout Analysis for Text Linearization", [Online]. Retrieved from the Internet: <https://aws-samples.github.io/amazon-textract-textractor/notebooks/layout_analysis_for_text_linearization.html>, (2022), 9 pages.

Github, "5397.413US1", [Online]. Retrieved from the Internet: <https://github.com/FullStackRetrieval-com/RetrievalTutorials/blob/main/tutorials/LevelsOfTextSplitting/5_Levels_Of_Text_Splitting.ipynb>, (Accessed on Nov. 6, 2025), 33 pages.

Github, "Document Layout Aware Processing and Retrieval Augmented Generation", [Online]. Retrieved from the Internet: <https://github.com/aws-samples/layout-aware-document-processing-and-retrieval-augmented-generation/blob/main/textract-api.ipynb>, (Accessed on Nov. 6, 2025), 42 pages.

Google Cloud, "Parse and chunk documents", Vertex AI Agent Builder, Google Cloud, (Accessed on Nov. 6, 2025), 24 pages.

Jstor, "What is a born digital or native PDF", [Online]. Retrieved from the Internet: <https://support.publishers.jstor.org/hc/en-us/articles/360042578374-What-is-a-born-digital-or-native-PDF>, (Accessed on Nov. 6, 2025), 3 pages.

Langchain Docs, "Advanced usage Retrieval", [Online]. Retrieved from the Internet: <https://docs.langchain.com/oss/javascript/langchain/retrieval>, (Accessed on Nov. 6, 2025), 8 pages.

Merritt, Rick, "What Is Retrieval-Augmented Generation, aka RAG?", [Online]. Retrieved from the Internet: <https://web.archive.org/web/20240712193921/https://blogs.nvidia.com/blog/what-is-retrieval-augmented-generation/>, (Wayback Machine snapshot Jul. 12, 2024), 17 pages.

Microsoft, "Azure AI Document Intelligence pricing", [Online]. Retrieved from the Internet: <https://azure.microsoft.com/en-us/pricing/details/ai-document-intelligence/#pricing>, (Accessed on Nov. 6, 2025), 12 pages.

Microsoft Ignite, "Document processing models", [Online]. Retrieved from the Internet: <https://learn.microsoft.com/en-us/azure/ai-services/document-intelligence/model-overview?view=doc-intel-4.0.0>, (Accessed on Nov. 6, 2025), 20 pages.

Microsoft Learn, "Retrieval-Augmented Generation with Azure AI Document Intelligence", [Online]. Retrieved from the Internet: <https://web.archive.org/web/20241103101359/https://learn.microsoft.com/en-us/azure/ai-services/document-intelligence/concept/retrieval-augmented-generation?view=doc-intel-4.0.0>, (Oct. 16, 2024), 9 pages.

Microsoft Learn, "What is Document Intelligence layout model?", [Online]. Retrieved from the Internet: <https://web.archive.org/web/20250123234101/https://learn.microsoft.com/en-us/azure/ai-services/document-intelligence/prebuilt/layout?view=doc-intel-4.0.0&tabs=rest%2Csample-code>, (Jan. 22, 2025), 14 pages.

Microsoft.Skills.Text.Splitskill, "Text Split Cognitive Skill", [Online]. Retrieved from the Internet: <https://web.archive.org/web/20240621103122/https://learn.microsoft.com/en-us/azure/search/cognitive-search-skill-textsplit#skill-parameters>, (Wayback Machine snapshot Jun. 21, 2024), 7 pages.

Openai Platform, "API Reference—Assistants", [Online]. Retrieved from the Internet: <https://platform.openai.com/docs/api-reference/project-users/object>, (Accessed on Nov. 6, 2025), 12 pages.

Openai Platform, "API Reference—Threads", [Online]. Retrieved from the Internet: <https://platform.openai.com/docs/api-reference/threads>, (Accessed on Nov. 6, 2025), 6 pages.

Openai Platform, "Text generation Learn how to prompt a model to generate text", [Online]. Retrieved from the Internet: <https://platform.openai.com/docs/guides/text>, (Accessed on Nov. 6, 2025), 7 pages.

Python, "pypdf 4.3.0 A pure-python PDF library capable of splitting, merging, cropping, and transforming PDF files", [Online]. Retrieved from the Internet: <https://web.archive.org/web/20240719034409/https://pypi.org/project/pypdf/>, (Released: Jul. 14, 2024), 5 pages.

\* cited by examiner

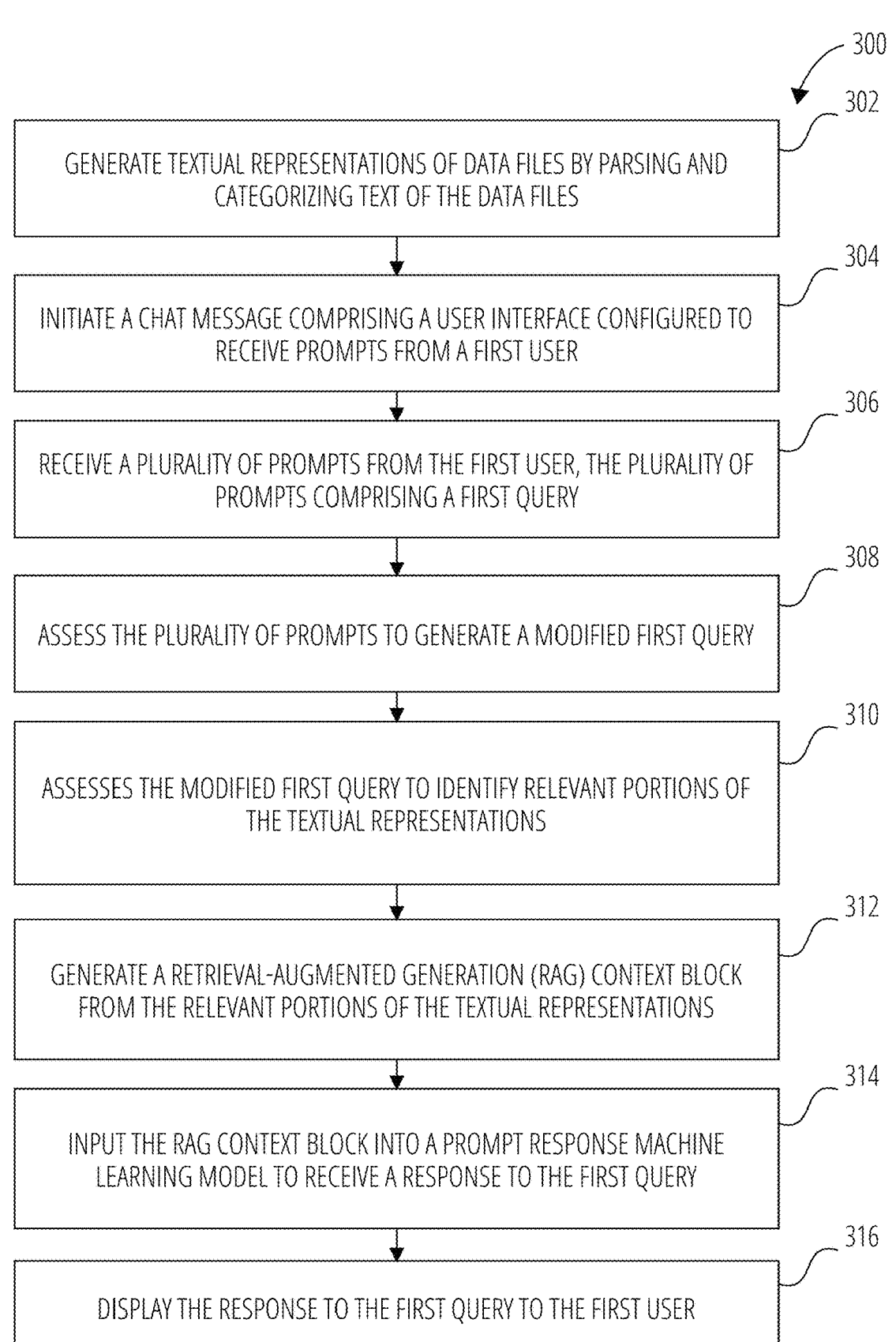

300

302

GENERATE TEXTUAL REPRESENTATIONS OF DATA FILES BY PARSING AND CATEGORIZING TEXT OF THE DATA FILES

304

INITIATE A CHAT MESSAGE COMPRISING A USER INTERFACE CONFIGURED TO RECEIVE PROMPTS FROM A FIRST USER

306

RECEIVE A PLURALITY OF PROMPTS FROM THE FIRST USER, THE PLURALITY OF PROMPTS COMPRISING A FIRST QUERY

308

ASSESS THE PLURALITY OF PROMPTS TO GENERATE A MODIFIED FIRST QUERY

310

ASSESSES THE MODIFIED FIRST QUERY TO IDENTIFY RELEVANT PORTIONS OF THE TEXTUAL REPRESENTATIONS

312

GENERATE A RETRIEVAL-AUGMENTED GENERATION (RAG) CONTEXT BLOCK FROM THE RELEVANT PORTIONS OF THE TEXTUAL REPRESENTATIONS

314

INPUT THE RAG CONTEXT BLOCK INTO A PROMPT RESPONSE MACHINE LEARNING MODEL TO RECEIVE A RESPONSE TO THE FIRST QUERY

316

DISPLAY THE RESPONSE TO THE FIRST QUERY TO THE FIRST USER

FIG. 3

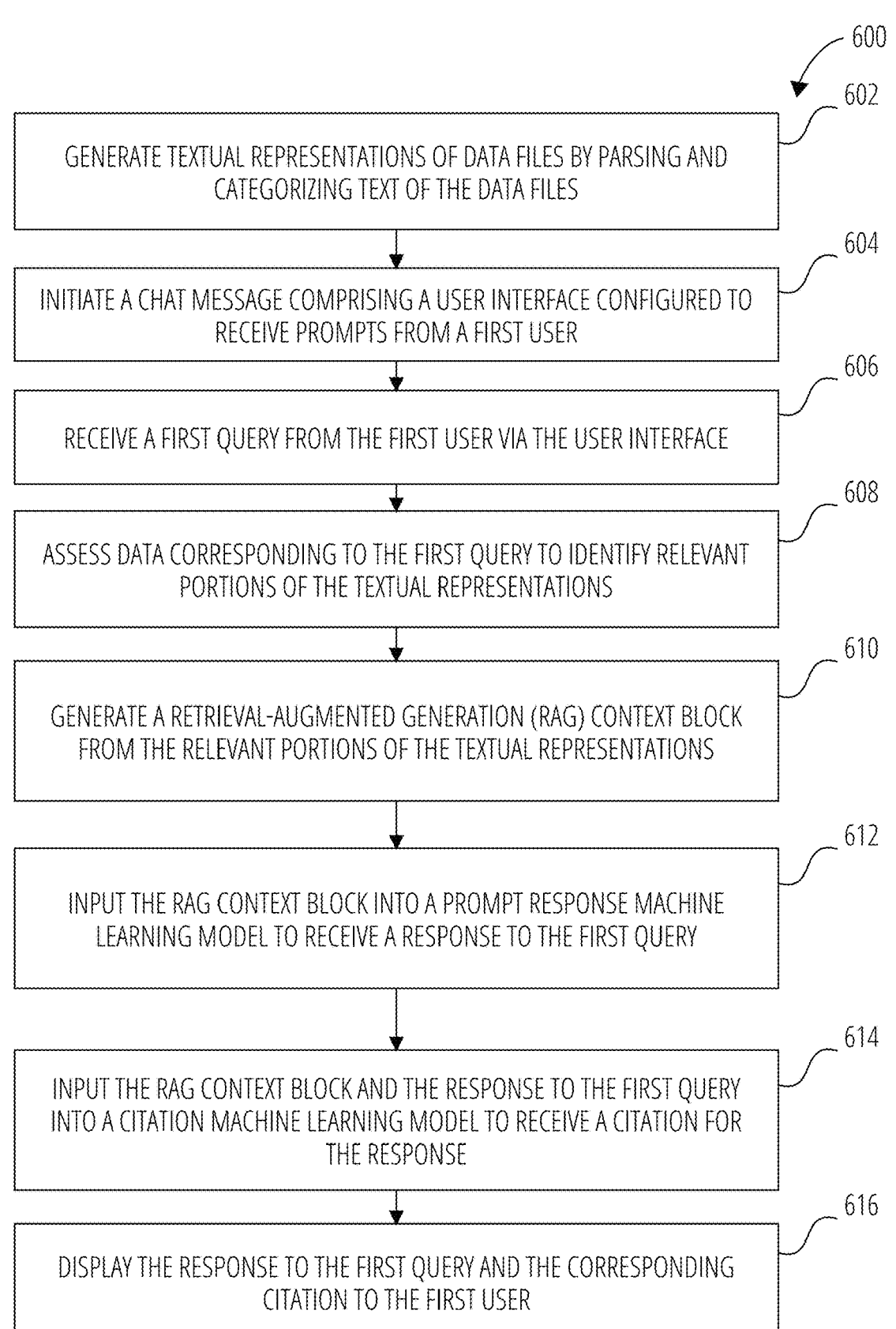

600

602
GENERATE TEXTUAL REPRESENTATIONS OF DATA FILES BY PARSING AND CATEGORIZING TEXT OF THE DATA FILES

604
INITIATE A CHAT MESSAGE COMPRISING A USER INTERFACE CONFIGURED TO RECEIVE PROMPTS FROM A FIRST USER

606
RECEIVE A FIRST QUERY FROM THE FIRST USER VIA THE USER INTERFACE

608
ASSESS DATA CORRESPONDING TO THE FIRST QUERY TO IDENTIFY RELEVANT PORTIONS OF THE TEXTUAL REPRESENTATIONS

610
GENERATE A RETRIEVAL-AUGMENTED GENERATION (RAG) CONTEXT BLOCK FROM THE RELEVANT PORTIONS OF THE TEXTUAL REPRESENTATIONS

612
INPUT THE RAG CONTEXT BLOCK INTO A PROMPT RESPONSE MACHINE LEARNING MODEL TO RECEIVE A RESPONSE TO THE FIRST QUERY

614
INPUT THE RAG CONTEXT BLOCK AND THE RESPONSE TO THE FIRST QUERY INTO A CITATION MACHINE LEARNING MODEL TO RECEIVE A CITATION FOR THE RESPONSE

616
DISPLAY THE RESPONSE TO THE FIRST QUERY AND THE CORRESPONDING CITATION TO THE FIRST USER

FIG. 6

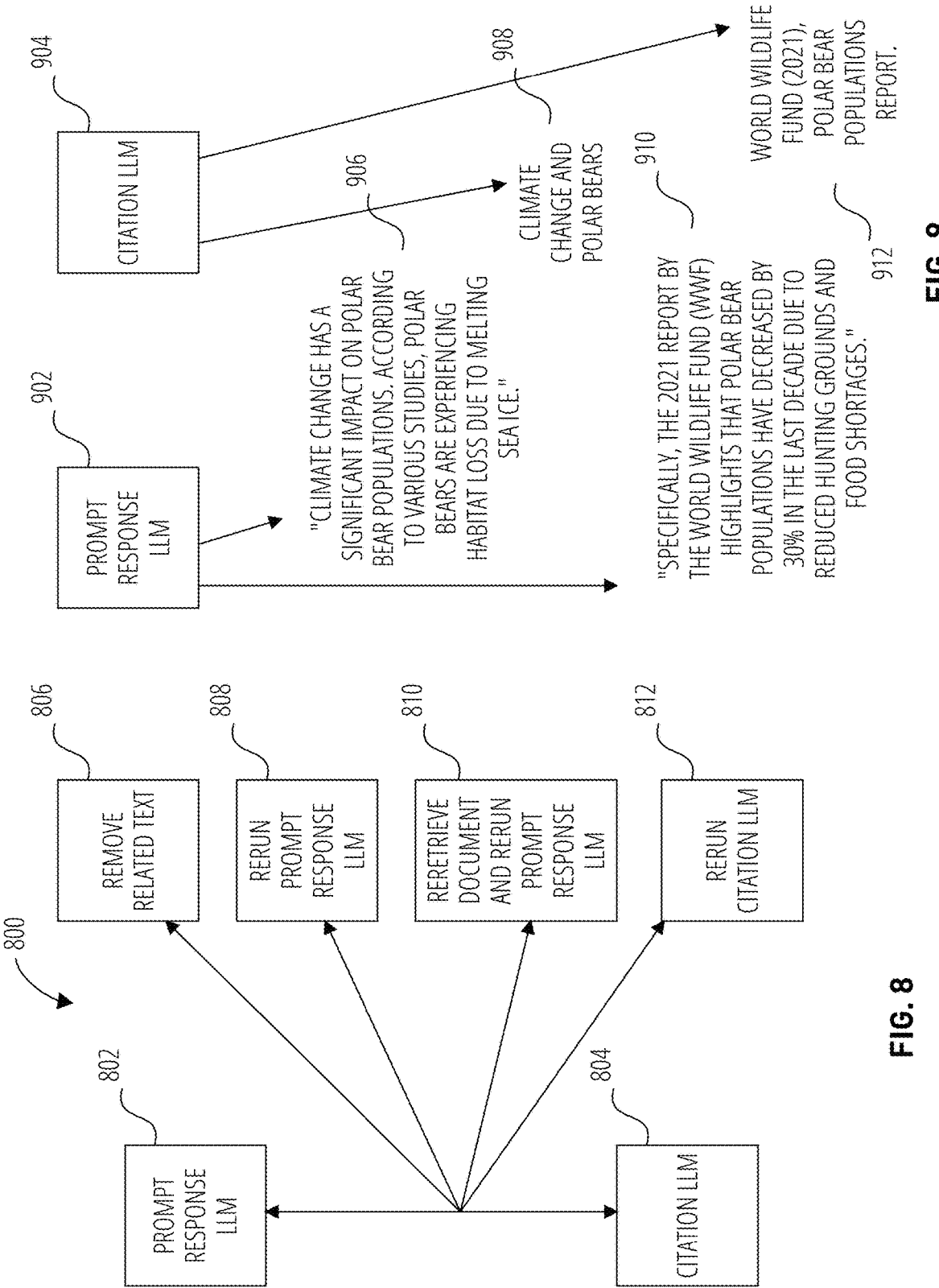

904

CITATION LLM

908

WORLD WILDLIFE FUND (2021), POLAR BEAR POPULATIONS REPORT.

906

CLIMATE CHANGE AND POLAR BEARS

910

902

PROMPT RESPONSE LLM

"CLIMATE CHANGE HAS A SIGNIFICANT IMPACT ON POLAR BEAR POPULATIONS. ACCORDING TO VARIOUS STUDIES, POLAR BEARS ARE EXPERIENCING HABITAT LOSS DUE TO MELTING SEA ICE."

"SPECIFICALLY, THE 2021 REPORT BY THE WORLD WILDLIFE FUND (WWF) HIGHLIGHTS THAT POLAR BEAR POPULATIONS HAVE DECREASED BY 30% IN THE LAST DECADE DUE TO REDUCED HUNTING GROUNDS AND FOOD SHORTAGES."

806
REMOVE RELATED TEXT

808
RERUN PROMPT RESPONSE LLM

810
RERETRIEVE DOCUMENT AND RERUN PROMPT RESPONSE LLM

812
RERUN CITATION LLM

800

802
PROMPT RESPONSE LLM

804
CITATION LLM

RECEIVE, IN ASSOCIATION WITH USER, NATURAL LANGUAGE REQUEST

1004

DETERMINE CONTEXT DATA FOR RESPONDING TO NATURAL LANGUAGE REQUEST

1006

USE SET OF LLMS TO GENERATE RESPONSE TO NATURAL LANGUAGE REQUEST BASED ON CONTEXT DATA AND NATURAL LANGUAGE REQUEST

Figure 11:
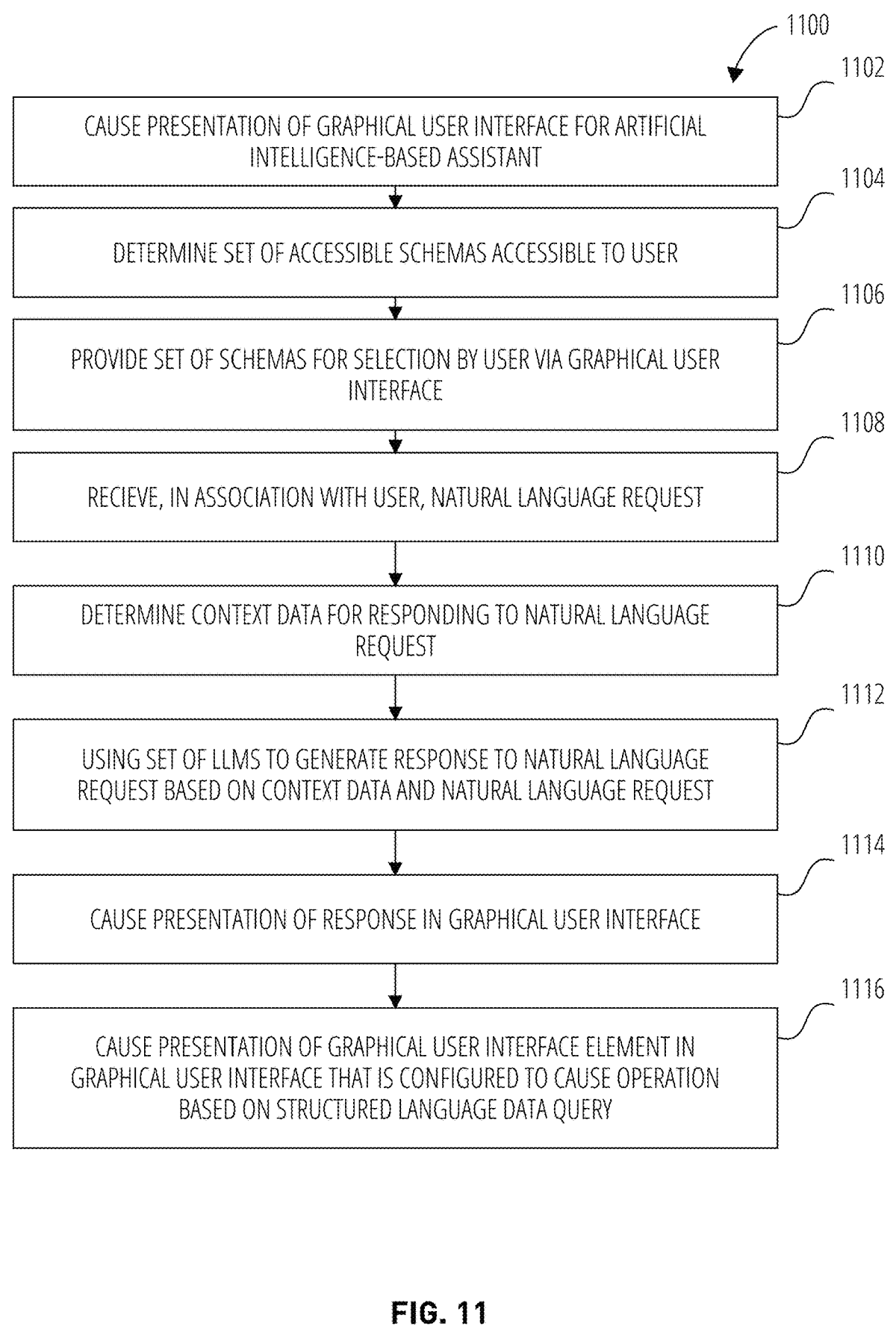

1100

1102

CAUSE PRESENTATION OF GRAPHICAL USER INTERFACE FOR ARTIFICIAL INTELLIGENCE-BASED ASSISTANT

1104

DETERMINE SET OF ACCESSIBLE SCHEMAS ACCESSIBLE TO USER

1106

PROVIDE SET OF SCHEMAS FOR SELECTION BY USER VIA GRAPHICAL USER INTERFACE

1108

RECIEVE, IN ASSOCIATION WITH USER, NATURAL LANGUAGE REQUEST

1110

DETERMINE CONTEXT DATA FOR RESPONDING TO NATURAL LANGUAGE REQUEST

1112

USING SET OF LLMS TO GENERATE RESPONSE TO NATURAL LANGUAGE REQUEST BASED ON CONTEXT DATA AND NATURAL LANGUAGE REQUEST

1114

CAUSE PRESENTATION OF RESPONSE IN GRAPHICAL USER INTERFACE

1116

CAUSE PRESENTATION OF GRAPHICAL USER INTERFACE ELEMENT IN GRAPHICAL USER INTERFACE THAT IS CONFIGURED TO CAUSE OPERATION BASED ON STRUCTURED LANGUAGE DATA QUERY

FEATURES

1412
CONTENT

1416
ATTRIBUTES

1420
USER DATA

1414
CONCEPTS

HISTORICAL DATA
1418

1424
MACHINE-LEARNING PROGRAM TRAINING

1406
TRAINING DATA

1404
TRAINING

1410
PREDICTION

1402
TRAINED MACHINE-LEARNING PROGRAM

1426
NEURAL NETWORK

1428
QUERY DATA

1422
PREDICTION/INFERENCE DATA

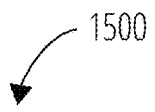
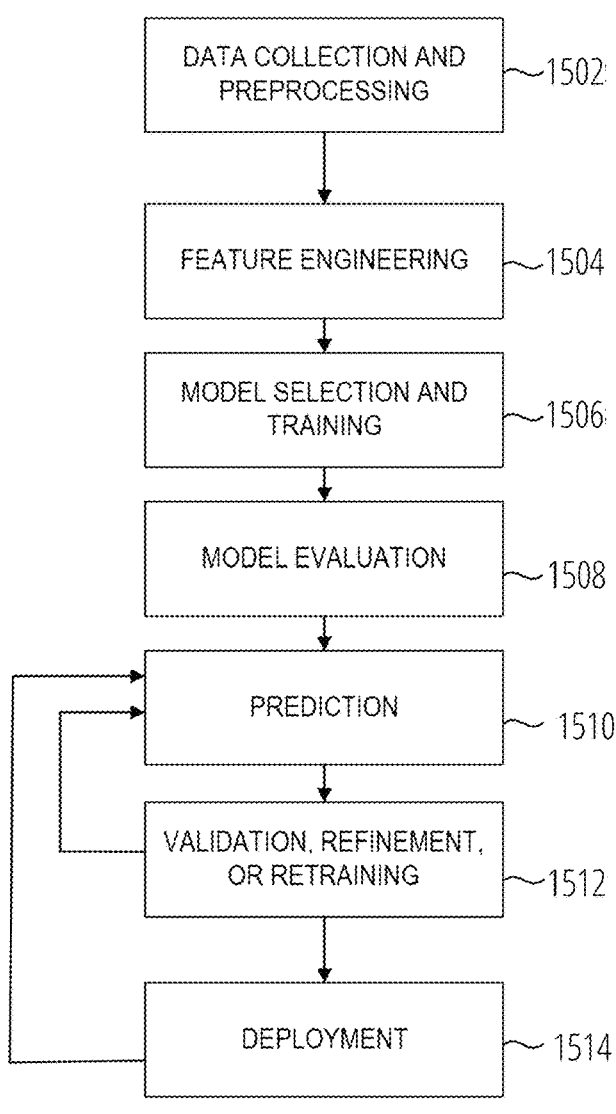
DATA COLLECTION AND PREPROCESSING ~1502
FEATURE ENGINEERING ~1504
MODEL SELECTION AND TRAINING ~1506
MODEL EVALUATION ~1508
PREDICTION ~ 1510
VALIDATION, REFINEMENT, OR RETRAINING ~1512
DEPLOYMENT ~ 1514
FIG. 15

EXECUTING QUERIES WITH HALLUCINATION SAFEGUARDS

PRIORITY CLAIM

This application claims the benefit of priority to U.S. Provisional Patent Application Ser. No. 63/682,924, filed Aug. 14, 2024, the contents of which are incorporated herein by reference.

TECHNICAL FIELD

Embodiments of the disclosure relate generally to executing queries and, more specifically, to executing queries with hallucination safeguards.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to types of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form.

BRIEF DESCRIPTION OF THE SEVERAL VIEWS OF THE DRAWINGS

The present disclosure will be apparent from the following more particular description of examples of embodiments of the technology, as illustrated in the accompanying drawings. The drawings are not necessarily to scale, emphasis instead being placed upon illustrating embodiments of the present disclosure. In the drawings, like numerals may describe similar components in different views. Like numerals having different letter suffixes may represent different instances of similar components. Various ones of the appended drawings merely illustrate example embodiments of the present disclosure and should not be considered as limiting its scope.

FIG. 3 illustrates an example method for executing a query with safeguards against hallucinations, in accordance with some embodiments.

FIG. 6 illustrates an example method for executing a query and generating citations with safeguards against hallucinations, in accordance with some embodiments.

FIG. 8 is an architectural diagram illustrating corrections to incorrect citations, in accordance with some embodiments.

FIG. 9 is an architectural diagram illustrating simultaneous parallel processing by the citation LLM with the prompt response LLM, in accordance with some embodiments.

FIG. 10 and FIG. 11 are flowcharts of example methods 1000, 1100 for generating a structured language data query based on a natural language question and context data relating to a schema of a datastore, in accordance with some embodiments of the present disclosure.

FIG. 15 illustrates a machine-learning pipeline, in accordance with some example embodiments.

DETAILED DESCRIPTION

Figure 1:
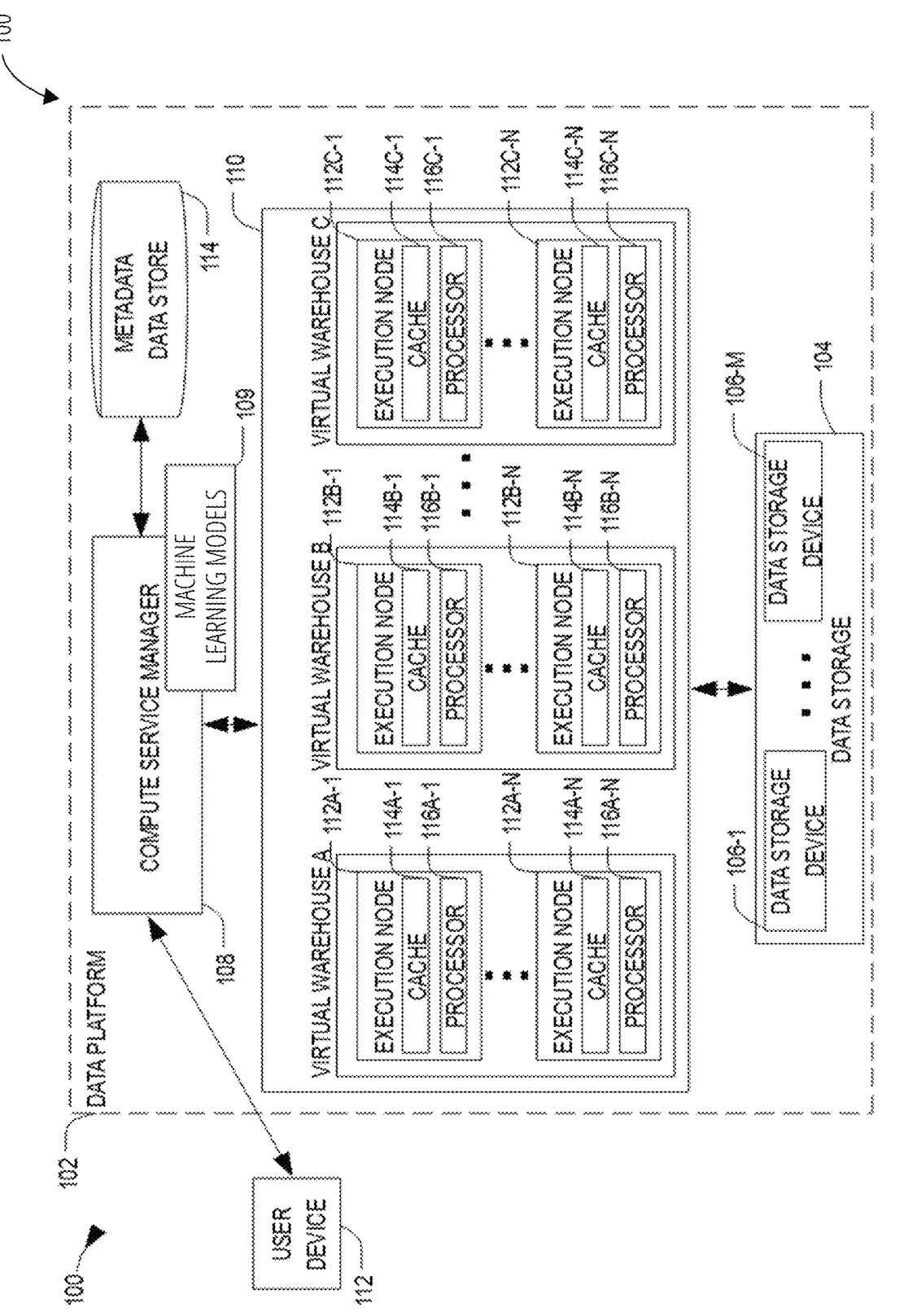
FIG. 1 illustrates an example computing environment that includes a cloud data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. For the purposes of this description, the phrase "cloud data platform" may be referred to as and used interchangeably with the phrases "a network-based database system," "a database system," or merely "a platform."

In the present disclosure, physical units of data that are stored in a data platform—and that make up the content of, e.g., database tables in user accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, on, etc.) what is referred to herein as an "internal storage location." If stored external to the data platform, a given file is referred to herein as an "external file" and is referred to as being stored in (or at, on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semi-conductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a user account. The data platform may include one or more databases that are respectively maintained in association with any number of user accounts (e.g., accounts of one or more data providers or other types of users), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular user accounts as well. Users and/or executing processes that are associated with a given user account may, via one or more types of clients, be able to cause data to be ingested into the database, and may also be able to manipulate the data, add additional data, remove data, run queries against the data, generate views of the data, and so forth.

In an implementation of a data platform, a given database (e.g., a database maintained for a user account) may reside as an object within, e.g., a user account, which may also include one or more other objects (e.g., users, roles, privileges, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

A data platform (e.g., database system) can support data storage for one or more different organizations (e.g., customer organizations, which can be individual companies or business entities), where each individual organization can have one or more accounts (e.g., customer accounts) associated with the individual organizations, and each account can have one or more users (e.g., unique usernames or logins with associated authentication information). Additionally, an individual account can have one or more users that are designated as an administrator for the individual account. An individual account of an organization can be associated with a specific cloud platform (e.g., cloud-storage platform, such as such as AMAZON WEB SERVICES™ (AWS™), MICROSOFT® AZURE®, GOOGLE CLOUD PLATFORM™), one or more servers or data centers servicing a specific region (e.g., geographic regions such as North America, South America, Europe, Middles East, Asia, the Pacific, etc.), a specific version of a data platform, or a combination thereof. A user of an individual account can be unique to the account. Additionally, a data platform can use an organization data object to link accounts associated with (e.g., owned by) an organization, which can facilitate management of objects associated with the organization, account management, billing, replication, failover/failback, data sharing within the organization, and the like.

Traditional systems for handling user queries and generating responses often fall short in several critical areas, primarily due to their limited ability to provide contextually relevant and accurate information. One significant limitation is their reliance on keyword-based search algorithms, which can fail to understand the nuances and context of user queries. This often results in irrelevant or incomplete search results, as these systems lack the sophisticated natural language understanding capabilities that more advanced models possess. Without the ability to understand context or infer meaning beyond simple keyword matching, these systems struggle to deliver accurate and useful information, especially for complex or multi-turn queries.

Another major shortfall of traditional systems is their inability to dynamically update and refine responses based on real-time user input. These systems typically generate responses in a linear fashion without iterative feedback or correction mechanisms. As a result, they cannot adapt to new information or correct errors as they occur, leading to static and potentially inaccurate responses. Moreover, traditional systems often lack integrated mechanisms for verifying and citing sources of information, which can result in responses that are not only incorrect but also unverifiable. This lack of citation and verification can undermine user trust and reduce the perceived reliability of the system.

Additionally, traditional systems are often not equipped to handle the efficient and accurate merging of large datasets or document chunks, which is crucial for providing comprehensive responses. Their inability to process and integrate multiple data sources seamlessly means that they can miss critical pieces of information that would be relevant to a user's query. This fragmentation of data processing and retrieval further hampers their effectiveness in delivering coherent and comprehensive answers. In summary, the primary deficiencies of traditional systems lie in their limited contextual understanding, lack of dynamic updating capabilities, and insufficient mechanisms for data integration and citation, all of which contribute to suboptimal user experiences.

Aspects of the present disclosure address the foregoing issues, among others, with a data platform, systems, methods, and devices that, through a combination of advanced machine learning models, dynamically processes queries with robust citation mechanisms. By leveraging LLMs for both query processing and response generation, the data platform can understand and interpret the nuances of user queries, ensuring that responses are contextually relevant and accurate. This semantic understanding allows the data platform to go beyond simple keyword matching, providing more precise and meaningful results, especially for complex or multi-turn queries.

One key innovation of the data platform is the use of a multi-turn approach, where the system can dynamically adjust the number of past interactions it considers to maintain context and relevance in ongoing conversations. This enables the data platform to handle complex queries that evolve over multiple turns, continuously refining and updating responses based on new information.

Additionally, the data platform can split queries into multiple portions and process them in parallel, ensuring efficient and comprehensive data retrieval. By combining results from these parallel searches, the platform can generate a more holistic and accurate response.

The data platform also integrates a retrieval-augmented generation (RAG) mechanism, which combines retrieved document chunks into a coherent context block that is fed into the LLM for response generation. This ensures that responses are not only accurate but also grounded in verifiable sources.

The data platform employs a separate citations LLM to verify and generate citations for the information provided, ensuring transparency and reliability. This citations LLM works in tandem with the prompt response LLM, either in parallel or series, to provide real-time citations that are updated as the response is generated.

Furthermore, the data platform includes robust mechanisms for cleaning and clipping citations to maintain formatting and discard unwanted endnotes or bibliographies, ensuring that the final output is clean and professional. By implementing regex matching and other text-matching techniques, the platform ensures that citations are accurate and appropriately formatted. This comprehensive approach addresses the key shortcomings of traditional systems, providing users with accurate, contextually relevant, and verifiable information in a dynamic and efficient manner.

FIG. 1 illustrates an example computing environment 100 that includes a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the cloud data platform 102 comprises a three-tier architecture: a compute service manager 108 coupled to a metadata datastore 114, an execution platform 110, and data storage 104. The cloud data platform 102 hosts and provides data access, management, reporting, and analysis services to multiple client accounts. Administrative users can create and manage identities (e.g., users, roles, and groups) and use permissions to allow or deny access to the identities to resources and services. The cloud data platform 102 is used for reporting and analysis of integrated data from one or more disparate sources including storage devices within the data storage 104. The data storage 104 comprises a plurality of computing machines and provides on-demand computer system resources such as data storage and computing power to the cloud data platform 102.

The compute service manager 108 includes multiple services that coordinate and manage operations of the cloud data platform 102. For example, the compute service manager 108 is responsible for performing query optimization and compilation as well as managing clusters of compute nodes that perform query processing (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also coupled to the metadata datastore 114. The metadata datastore 114 stores metadata pertaining to various functions and aspects associated with the cloud data platform 102 and its users. The metadata datastore 114 also includes a summary of data stored in data storage 104 as well as data available from local caches. Additionally, the metadata datastore 114 includes information regarding how data is organized in the data storage 104 and the local caches.

As shown, the compute service manager 108 includes one or more machine learning models 109. The data platform incorporates the use of LLMs. At the core of the system is the primary LLM, responsible for generating human-like responses to user prompts. This LLM is supported by several auxiliary components, such as the document retrieval system, which fetches relevant documents from a database based on the user's query. These documents are then processed and chunked into manageable pieces to facilitate efficient retrieval and relevance assessment. The LLM uses these chunks to generate contextually rich responses, ensuring that the information provided is accurate and relevant to the user's needs.

Alongside the primary LLM, a separate citation LLM operates to verify and generate accurate citations for the information included in the responses. The citation LLM works either in parallel or in series with the primary LLM, depending on the system's design. In a parallel setup, the citation LLM receives the text generated by the primary LLM in real-time and attempts to match it with source documents, providing immediate feedback and corrections. In a series setup, the citation LLM processes the generated response after the primary LLM has completed its task. The citations are then cleaned and formatted to ensure consistency and readability. This dual-LLM approach allows the system to maintain high accuracy in content generation while ensuring that all cited information is properly verified and presented, ultimately enhancing the reliability and user experience of the system. Further details of the operation of the machine learning models 109 are discussed below.

The compute service manager 108 is also in communication with a user device 112. The user device 112 corresponds to a user of one of the multiple client accounts supported by the cloud data platform 102. In some implementations, the compute service manager 108 does not receive any direct communications from the user device 112 and only receives communications concerning jobs from a queue within the cloud data platform 102.

The compute service manager 108 is also coupled to the metadata datastore 114. The metadata datastore 114 stores metadata pertaining to various functions and aspects associated with the cloud data platform 102 and its users. The metadata datastore 114 also includes a summary of data stored in data storage 104 as well as data available from local caches. Additionally, the metadata datastore 114 includes information regarding how data is organized in the data storage 104 and the local caches.

The compute service manager 108 is further coupled to the execution platform 110, which includes multiple virtual warehouses (computing clusters) that execute various data storage and data retrieval tasks. As an example, a set of processes on a compute node executes at least a portion of a query plan compiled by the compute service manager 108. As shown, the execution platform 110 includes virtual warehouse A, virtual warehouse B, and virtual warehouse C. Each virtual warehouse includes multiple execution nodes that each includes a data cache and a processor. For example, as shown, virtual warehouse A includes execution nodes

112A-1 to 112A-N; execution node 112A-1 includes a cache 114A-1 and a processor 116A-1; and execution node 112A-N includes a cache 114A-N and a processor 116A-N. Similarly, in this example, virtual warehouse B includes execution nodes 112B-1 to 112B-N; execution node 112B-1 includes a cache 114B-1 and a processor 116B-1; and execution node 112B-N includes a cache 114B-N and a processor 116B-N. Additionally, virtual warehouse C includes execution nodes 112C-1 to 112C-N; execution node 112C-1 includes a cache 114C-1 and a processor 116C-1; and execution node 112C-N includes a cache 114C-N and a processor 116C-N.

Each execution node of the execution platform 110 is assigned to processing one or more data storage and/or data retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 110 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 110 may include any number of virtual warehouses. Additionally, the number of virtual warehouses in the execution platform 110 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 1 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 1 each include a single data cache and a single processor, in other examples, execution nodes can contain any number of processors and any number of caches. Also, the caches may vary in size among the different execution nodes.

In some examples, the virtual warehouses of the execution platform 110 operate on the same data, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although virtual warehouses A, B, and C are illustrated with an association with the same execution platform 110, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 110 is coupled to data storage 104. The data storage 104 comprises multiple data storage devices 106-1 to 106-M. In some embodiments, the data storage devices 106-1 to 106-M are cloud-based storage devices located in one or more geographic locations. For example, the data storage devices 106-1 to 106-M may be part of a public cloud infrastructure or a private cloud infrastructure. The data storage devices 106-1 to 106-M may be hard disk drives (HDDs), solid state drives (SSDs), storage clusters, Amazon S3™ storage systems or any other data storage technology. Additionally, the data storage 104 may include distributed file systems (e.g., Hadoop Distributed File Systems (HDFS)), object storage systems, and the like. In some examples, the storage devices 106-1 to 106-M are managed and provided by a third-party data storage platform (e.g., AWS®, Microsoft Azure Blob Storage®, or Google Cloud Storage®).

Each virtual warehouse can access any of the data storage devices 106-1 to 106-M shown in FIG. 1. Thus, the virtual warehouses are not necessarily assigned to a specific data storage device 106-1 to 106-M and, instead, can access data from any of the data storage devices 106-1 to 106-M within the data storage 104. Similarly, each of the execution nodes shown in FIG. 1 can access data from any of the data storage devices 106-1 to 106-M. In some examples, a particular virtual warehouse or a particular execution node may be temporarily assigned to a specific data storage device, but the virtual warehouse or execution node may later access data from any other data storage device.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another.

As shown in FIG. 1, the data storage devices 106-1 to 106-M are decoupled from the computing resources associated with the execution platform 110. This architecture supports dynamic changes to the cloud data platform 102 based on the changing data storage/retrieval needs as well as the changing needs of the users and systems. The support of dynamic changes allows the cloud data platform 102 to scale quickly in response to changing demands on the systems and components within the cloud data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more execution nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadatastored in the metadata datastore 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the data storage 104.

The compute service manager 108, metadata datastore 114, execution platform 110, and data storage 104 are shown in FIG. 1 as individual discrete components. However, each of the compute service manager 108, metadata datastore 114, execution platform 110, and data storage 104 may be implemented as a distributed system (e.g., distributed across multiple systems/platforms at multiple geographic locations). Additionally, each of the compute service manager 108, metadata datastore 114, execution platform 110, and data storage 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

As shown in FIG. 1, the computing environment 100 separates the execution platform 110 from the data storage 104. In this arrangement, the processing resources and cache resources in the execution platform 110 operate independently of the data storage devices 106-1 to 106-M in the data storage 104. Thus, the computing resources and cache resources are not restricted to specific data storage devices 106-1 to 106-M. Instead, all computing resources and all cache resources may retrieve data from, and store data to, any of the data storage resources in the data storage 104.

Figure 2:
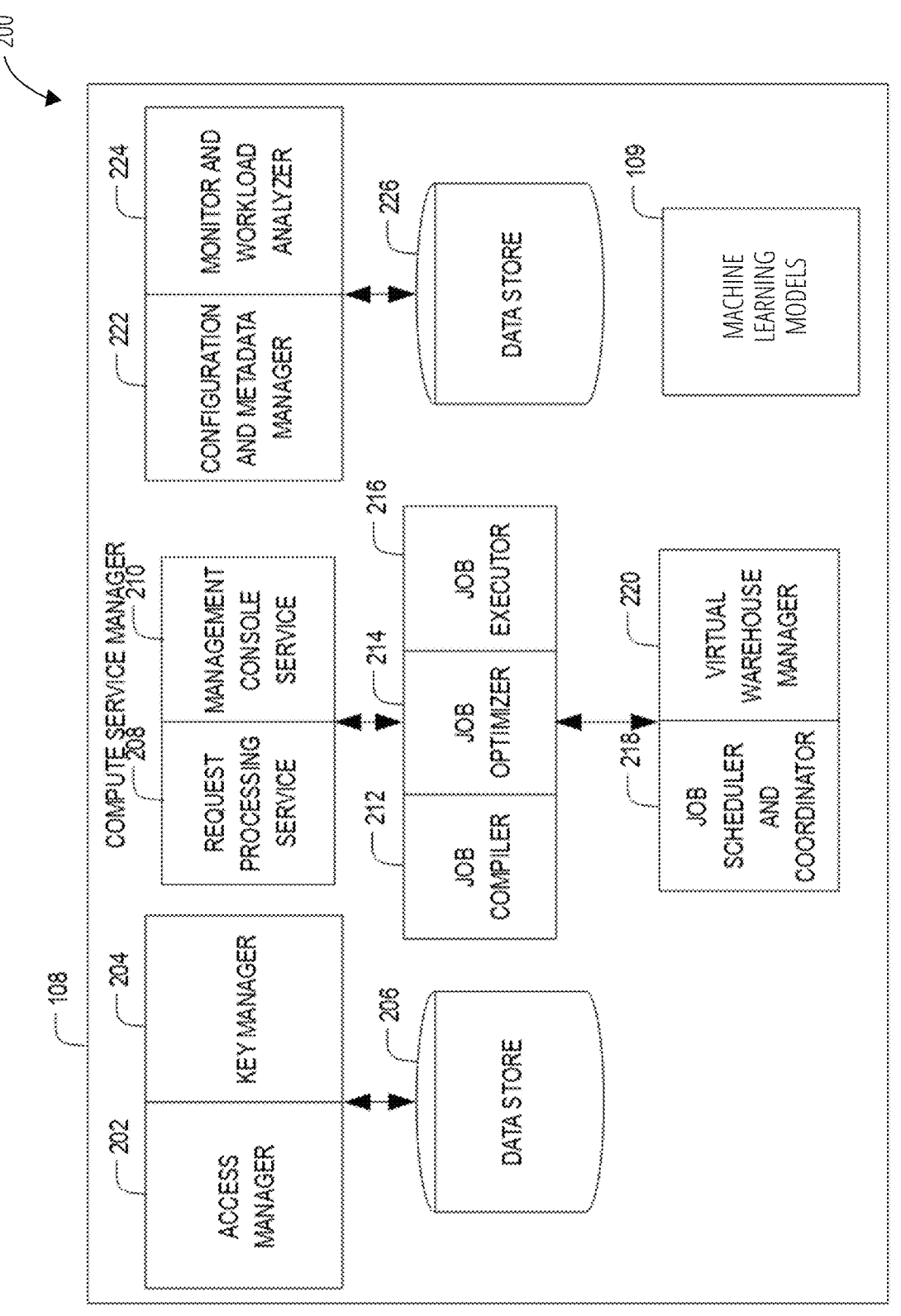
FIG. 2 is a block diagram illustrating components of a compute service manager of the cloud data platform, in accordance with some embodiments of the present disclosure.

FIG. 2 is a block diagram 200 illustrating components of the compute service manager 108, in accordance with some embodiments of the present disclosure. As shown in FIG. 2, the compute service manager 108 includes an access manager 202 and a key manager 204 coupled to a datastore 206 that stores access information. Access manager 202 handles authentication and authorization tasks for the systems described herein. Key manager 204 manages storage and authentication of keys used during authentication and authorization tasks. For example, access manager 202 and key manager 204 manage the keys used to access datastored in remote storage devices (e.g., data storage devices in data storage 104).

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 identifies or assigns particular nodes in the execution platform 110 to process particular tasks.

A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the datastored in the remote data storage devices and in the local caches (e.g., the caches in execution platform 110). The configuration and metadata manager 222 uses the metadata to determine which storage units need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a datastore 226. Datastore 226 in FIG. 2 represents any data repository or device within the cloud data platform 102. For example, datastore 226 may represent caches in execution platform 110, storage devices in data storage 104, the metadata datastore 114, or any other storage device or system.

In addition, as mentioned above, the compute service manager 108 includes the machine learning models 109 that are responsible for many aspects of the embodiments herein. Further details regarding the functionality of the machine learning models 109 are discussed below.

FIG. 3 illustrates an example method 300 for executing a query with safeguards against hallucinations, in accordance with some embodiments. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

The embodiments described herein are described as being performed by certain systems or applying certain processes, such as a particular machine learning model, but the processes described herein can be performed by one or more other or the same machine learning models.

The embodiments described herein are described for prompts or queries. However, it is appreciated that for an embodiment describing a feature applying a prompt, the embodiment can also apply to a query, and vice versa. For example, the data platform can receive a query from the user, and the data platform can generate a prompt as input for the LLM.

At operation 302, the data platform generates textual representations of data files by parsing and categorizing text of the data files. The data platform parses the text within the data files and then categorizes this text to create structured data that can be easily indexed and searched, which enables efficient retrieval of information from a large collection of uploaded documents.

Figure 4:
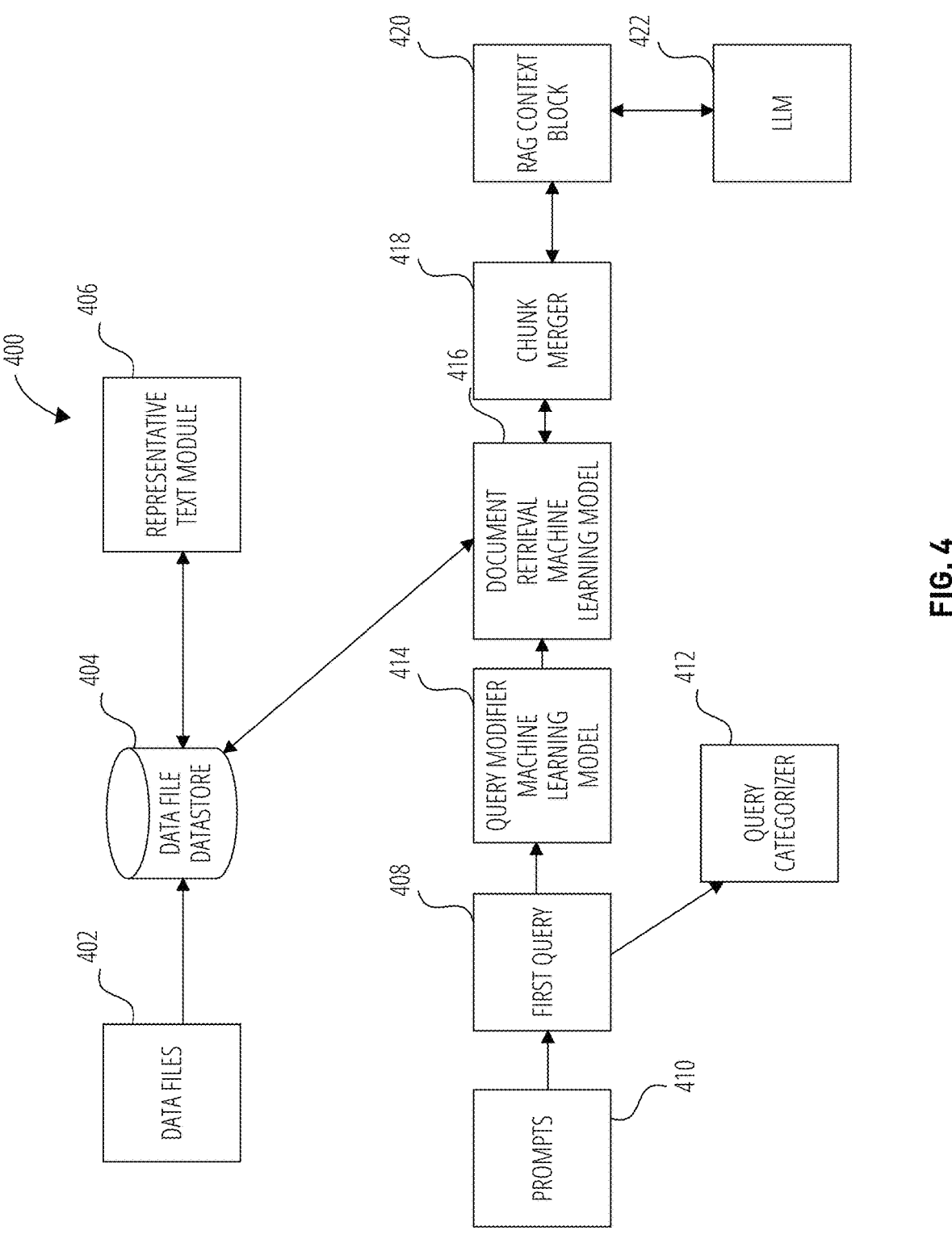
FIG. 4 is an architectural diagram illustrating a process for mitigating or eliminating hallucinations during query execution, in accordance with some embodiments.

FIG. 4 is an architectural diagram 400 illustrating a process for mitigating or eliminating hallucinations during query execution, in accordance with some embodiments. In some cases, the customer uploads a large number of files (e.g., PDFs, Word documents) to the data platform, such as the data files 402. The data platform stores such data files in the data file datastore 404. In some cases, the customer continuously uploads files during use of the data platform, and the data platform can continuously store such data files and perform one or more features as described herein continuously.

The data platform executes a representative text module 406. The representative text module 406 can apply optical character recognition (OCR) if the uploaded files are in formats that do not contain directly readable text (e.g., scanned images of documents), where the representative text module 406 converts images of text into machine-encoded text.

The data platform parses the text extracted from the files by analyzing the text to understand its structure and content. This can include breaking the text into manageable pieces such as sentences, paragraphs, and sections.

After parsing, the data platform categorizes the text by identifying different components or sections of the documents, such as titles, headers, sections, authors, abstracts, and main content, and associating the portions of the data files to the corresponding components or sections. This structured representation helps in organizing the text for better indexing and retrieval.

The result of this process is a set of textual representations that maintain the structure and content of the original documents, which the data platform stores in the data file datastore 404. These representations are stored in a way that facilitates efficient searching and indexing.

The textual representations are used to build a search index. The search index is a database that allows for quick and efficient retrieval of information based on keyword searches and other query parameters.

Once the search index is created, the search index is integrated with the Chat API module 416 that is configured to handle queries, retrieve relevant information from the search index, and/or generate responses using an LLM (Large Language Model).

Returning to FIG. 3, the data platform performs operation 302 to transform raw, unstructured documents into structured, searchable textual representations. This foundation enables the Chat API to provide accurate, relevant, and efficient responses to user queries, leveraging the power of RAG to minimize hallucinations and improve the reliability of LLM-based solutions.

The data platform can generate textual representations of data in various formats, such as videos or images, by leveraging a combination of computer vision (CV) models, optical character recognition (OCR), document understanding models, and natural language processing (NLP) techniques. The data platform can transform non-text data (like images and videos) into structured textual descriptions that can be analyzed or fed into AI models.

For images, the data platform can use image recognition and captioning models to convert visual content into text. For example, the data platform can apply convolutional neural networks (CNNs) for feature extraction, where the model identifies key elements within the image, such as objects, scenes, or actions. These features are then passed to a recurrent neural network (RNN) or a transformer model to generate natural language descriptions of the image. For example, a model might take an image of a beach and generate the caption: "A beach with clear blue water and people swimming."

In some cases, images may contain text themselves (e.g., scanned documents or images of signs). For these scenarios, the data platform applies optical character recognition (OCR) that identifies and extracts text embedded in images. OCR works by analyzing the structure of letters and words, converting them into machine-readable text.

For video data, the data platform extracts individual frames or a sequence of frames at specific intervals. These frames can then be processed similarly to images, where object detection or action recognition models identify key visual elements and activities. Once the system recognizes the objects, people, or actions in each frame, it can generate descriptive text for each scene. For example, in a video of a soccer match, the system might generate textual descriptions like, "A player is kicking the ball toward the goal."

In addition to analyzing visual content, videos often contain audio components, such as spoken language or sounds. The data platform uses speech-to-text technology to convert spoken words from the audio track into text, such as via automatic speech recognition (ASR) models that transcribe speech from the audio into a textual format. By combining the visual analysis (from the video frames) with the transcribed audio (from the speech), the data platform can create comprehensive textual representations that capture both the visual and auditory elements of the video.

To generate accurate textual representations from complex multimedia data (like videos), the data platform can combine multiple modalities-visual, auditory, and contextual. For example, a video of a person giving a presentation can be broken down into visual information (identifying the speaker and their actions) and auditory information (transcribing what they are saying). The data platform can merge these two sources to create a cohesive text that not only describes the visual elements but also captures the spoken content, e.g., "The speaker is explaining the growth trend using a chart."

At operation 304, the data platform initiates a chat message comprising a user interface configured to receive prompts from a first user. The data platform initiates display of the interactive component through which users can input their queries or commands, allowing the system to interact with the users effectively. In some cases, the data platform provides users with programmatic access via an API enabling users to provide and/or use custom user interfaces. In some cases, the platform provides a user interface for the user to interact with.

The system initializes the user interface (UI) that will be used for the chat interaction. This UI is designed to be user-friendly and intuitive, ensuring that users can easily input their prompts and receive responses. A chat message is generated by the data platform, which serves as the starting point of the interaction.

The UI is configured to receive multiple types of inputs from the user. These inputs can include text queries, commands, voice inputs, or the like depending on the configuration of the data platform. The platform manages user sessions and prompts to maintain context throughout the interaction. This includes tracking the history of prompts and responses, enabling a seamless conversational flow.

The UI includes an input field where users can type their queries or commands. This field may include features such as autocomplete suggestions and error correction to enhance user experience. Autocomplete suggestions help users by predicting the rest of their query as they type, speeding up the input process and reducing errors. The data platform can maintain a database of commonly asked questions and phrases relevant to the domain of the chat application. This database can be built from historical data of similar users or the particular user, or designed based on anticipated user needs.

In some embodiments, the data platform uses predictive text algorithms that analyze the initial characters typed by the user and match them with the most likely completions from the database. These predictive text algorithms can leverage machine learning models trained on a large corpus of text to improve prediction accuracy. The data platform can execute real-time processing to provide suggestions instantly as the user types.

The user interface can include an area where responses generated by the system are displayed. This area updates dynamically as the conversation progresses. The user interface can include interaction buttons for common actions such as submitting a query, clearing the input field, or accessing help and support.

Returning to FIG. 3, at operation 306, the data platform receives a plurality of prompts from the first user, the plurality of prompts comprising a first query. The data platform is designed to handle multiple user inputs, or "prompts," that collectively form a history of queries from the user. The data platform maintains a session for each user, tracking the sequence of prompts within a conversation.

As shown in the example of FIG. 4, the data platform receives a plurality of prompts 410. The series of prompts provided by the user give context to subsequent prompts. Each prompt is stored in a database or in-memory data structure, indexed by session ID and timestamp. This ensures that the order of prompts is preserved, which is essential for understanding context.

As the user enters prompts, the system processes each one in real-time, appending the latest prompt to the current session's context. This immediate processing allows for dynamic interactions and adjustments based on new inputs. As an example, if a user is interacting with a financial data platform and the user's prompts are as follows: Prompt 1: "Show me the quarterly earnings for Q1 2023." Prompt 2: "How does this compare to the previous quarter?" Prompt 3: "And what about the same quarter last year?" In this example, the data platform receives three prompts that collectively provide context for a more comprehensive query about quarterly earnings and their comparisons over different periods. In some cases, the data platform can suggest follow up queries to the user as a set of clickable buttons. The selection of the clickable buttons would be used to generate the next prompt for the user.

Returning to FIG. 3, in between or within one of the operations of FIG. 3, the data platform assesses prompts to identify a query. In some embodiments, the data platform also categorizes the prompts via the query categorizer 412. This categorization process helps the data platform to determine whether the prompt requires data retrieval from a third-party dataset or if the prompt can be responded to by an LLM directly.

For example, the data platform classifies the prompts into three distinct categories. The first category can include a conversational prompt that does not require any search or retrieval from an indexed database. For instance, greetings or simple expressions of courtesy fall into this category. When a prompt is categorized as such a pleasantry, the data platform can immediately request an LLM to provide a quick and fast response, ensuring a seamless conversational flow without unnecessary delays.

Prompt categories can include a dataset-specific question, where these prompts specifically ask for information that needs to be retrieved from a database. For example, if a user queries specific data points or trends within a dataset, the system recognizes the need for database retrieval to generate an accurate response. In this case, the system initiates the necessary search processes, as further described herein, to fetch the relevant data from the indexed tables or databases.

Prompt categories can include questions on metadata, where this category includes queries about the dataset's metadata or general knowledge about the data. For example, if a user asks about the type of data available or how to interact with the dataset, the system categorizes such prompts as a metadata question. This type of prompt involves providing information about the dataset's structure, available fields, or how to perform specific queries, and as such, initiates the necessary search processes, as further described herein.

In some cases, the data platform generates a summary and/or metadata corresponding to the dataset. The metadata can be used by the LLM to provide the LLM with context for the current query. The metadata can be used as changes are made to the datastore, such as newly uploaded documents.

To efficiently handle this categorization, the data platform can apply a separate machine learning model, such as a smaller LLM, which specializes in classifying prompts into these categories. By leveraging this categorization step, the data platform can quickly determine the appropriate action for each prompt. If a prompt is classified as a pleasantry, the system can bypass the search index and directly generate a response using the LLM. For dataset-specific questions and metadata inquiries, the system proceeds with the document or text retrieval processes as described herein, ensuring that users receive accurate and relevant information based on their queries.

At operation 308, the data platform assesses the plurality of prompts to generate a modified first query. The data platform analyzes the series of prompts to understand the overall context of the latest prompt, which can include identifying the key entities, dates, and relationships mentioned across all prompts.

In some embodiments, the data platform uses a query modifier machine learning model. As an example in FIG. 4, the data platform applies a query modifier machine learning model 414 that may include the query modifier machine learning model. The query modifier machine learning model can be trained to receive as input one or more prompts (or queries) by the user and generate a modified query, such as modifying the first query 408 to generate the modified query, of the latest prompt from the user.

The query modifier machine learning model can include a natural language processing machine learning model. The data platform employs a natural language processing machine learning model to parse and interpret the meaning of each prompt. This can include entity recognition (e.g., identifying "quarterly earnings" and specific dates) and intent detection (e.g., understanding that the user wants a comparison).

The query modifier machine learning model synthesizes the information from all prompts to generate a modified first query by merging the individual prompts into a coherent and comprehensive query that accurately reflects the user's intent. Then the query modifier machine learning model can optimize the modified query for retrieval from the data platform, such as by rephrasing the query to match the syntax and structure expected by the underlying data retrieval system.

The query modifier machine learning model is trained to assess prompts that are not the latest prompt received from the user to determine a context for the latest prompt or query identified in the latest prompt. The query modifier machine learning model can apply multi-turns of prompts. The multi-turns refers to the query modifier machine learning model's ability to handle a sequence of user inputs or prompts, considering their context and relationships to provide coherent and contextually accurate responses.

The number of multi-turns specifies how many previous prompts the system considers when generating a response. This number can be preset, such as 3, 50, or 100, indicating the fixed count of previous prompts the system will always review. If preset to 3, the system always considers the last three prompts.

Alternatively, the number can be dynamically adjusted based on the context or complexity of the conversation, ensuring the system remains flexible and efficient. The system may start by considering the last 2 prompts but expand to the last 5 if the conversation's complexity increases or the user's queries become more interrelated.

There are several reasons why the data platform changes the number of multi-turns dynamically in a conversation. The data platform or a machine learning model, such as the query modifier machine learning model, can make such assessments between prompts, such as the latest prompt and historical prompts provided by the user. Dynamic adjustment of multi-turns allows the system to better handle various scenarios, ensuring relevant context is maintained while optimizing computational resources.

When a conversation becomes more intricate, with multiple interrelated queries, the data platform can increase the number of multi-turns to maintain a broader context. Conversely, if the conversation shifts to simpler, less related queries, the data platform reduces the number of multi-turns to focus on immediate context.

If the user abruptly changes the topic of discussion, the data platform may decrease the multi-turns to avoid irrelevant context from previous topics. If the user continues discussing the same topic, the data platform may increase the multi-turns to incorporate all relevant prior queries and responses.

In longer interaction sessions, the data platform may need to expand the multi-turn range to ensure the model captures the extended context of the conversation. If the user frequently asks for clarifications or details, the data platform may expand the multi-turns to help the model provide more accurate and cohesive responses.

For accurate responses, such as in technical or detailed discussions, the data platform may dynamically increase multi-turns to retain necessary context. To avoid irrelevant information and focus on accuracy, the data platform might reduce the multi-turns if earlier prompts are no longer relevant.

Dynamically adjusting the number of multi-turns can help manage computational resources, ensuring the data platform remains responsive and efficient. In contrast, the data platform may reduce the number of multi-turns when fewer resources are needed which can decrease processing time and improve response speed.

The data platform can allow users to set preferences for how much past context should be considered, enabling dynamic adjustments based on these settings. Moreover, based on user feedback, the system can learn to adjust multi-turns to better suit individual user interaction styles.

If the data platform detects a misunderstanding or incorrect response, the data platform may increase the multi-turns to reevaluate the context and provide a corrected answer. When users correct the system's responses, having more turns in context can help the system understand the nature of the correction better.

One approach to handling multi-turn interactions is for the data platform to use a separate Large Language Model (LLM) dedicated to assessing and summarizing prior prompts. This LLM can analyze the sequence of previous inputs, extract relevant information, and provide a concise summary or context for the main LLM generating the final response. This method allows for a more detailed and focused context assessment without overburdening the primary LLM.

For example, the data platform assesses three prompts and generates a modified first query.

"Show me the quarterly earnings for Q1 2023"

"How does this compare to the previous quarter?"

"And what about the same quarter last year?"

The query modifier machine learning model can receive as input the three prompts and generate the following modified query: "Provide a report on the quarterly earnings for Q1 2023, including comparisons with Q4 2022 and Q1 2022."

The query modifier machine learning model captures each user prompt in sequence and stores them in the user's session history. The query modifier machine learning model identifies that "quarterly earnings," "Q1 2023," "previous quarter," and "same quarter last year" are key entities and time frames. The query modifier machine learning model understands that the user is looking for a comparison of earnings across multiple time periods.

Using natural language processing, the query modifier machine learning model parses each prompt, extracting relevant entities and relationships. The query modifier machine learning model synthesizes these entities into a single query that encapsulates the user's entire request.

The query modifier machine learning model generates the final modified query, ensuring the query is structured for efficient data retrieval: "Provide a report on the quarterly earnings for Q1 2023, including comparisons with Q4 2022 and Q1 2022."

As such, the data platform can effectively handle complex, multi-turn interactions with users, providing accurate and contextually relevant responses based on a comprehensive understanding of the user's prompts.

In some embodiments, the data platform applies a skew on return feature that biases the data platform towards more recent prompts when generating a response. This means that while the data platform considers multiple turns, the platform gives higher priority or weight to the most recent inputs, ensuring the latest context or changes in the conversation are emphasized.

If a user initially asks about "quarterly earnings for Q1 2023" and later inquires about "annual earnings for 2023," the data platform can skew its response towards the latter, more recent prompt while still considering the previous context.

In some embodiments, the data platform applies clipping on the number of turns, which limits the maximum number of previous prompts the model can consider. This helps manage computational resources and maintain response efficiency, especially in lengthy conversations. By clipping, the data platform ensures the model does not become overwhelmed by an extensive history of prompts, which might dilute the relevance of the immediate context. For example, if the clipping limit is set to 5, even if the conversation has 10 previous prompts, the system will only consider a maximum of the last 5 prompts for context.

Returning to FIG. 3, at operation 310, the data platform assesses the modified first query to identify relevant portions of the textual representations. The data platform assesses the modified first query by inputting the modified first query into a document retrieval machine learning model. The document retrieval machine learning model is trained to identify portions of textual representations of documents that are relevant to inputted queries.

In some embodiments, the data platform concatenates a plurality of queries and inputs the concatenated queries into the document retrieval machine learning model. In some embodiments, the data platform generates such a concatenated query without rewriting the query. This approach ensures that the LLM has access to the entire conversation context in its original form, preserving the exact phrasing and structure of the user's inputs.

For example, if the user prompts are:

1. "Show me the quarterly earnings for Q1 2023"

2. "How does it compare to Q4 2022?"

3. "And what about the annual earnings for 2023?"

The modified first query can include "Show me the quarterly earnings for Q1 2023. How does it compare to Q4 2022?. And what about the annual earnings for 2023?"

The document retrieval machine learning model applies a semantic search over any input table previously indexed and parsed. The document retrieval machine learning model is trained to interpret and understand the semantics of the input query, enabling the document retrieval machine learning model to match the query with relevant sections of the indexed documents, ensuring that the retrieved information is contextually accurate and relevant to the user's needs.

The search index within the data platform is powered by this separate document retrieval machine learning model, which can be a smaller LLM. This model is responsible for maintaining an efficient and comprehensive index of the parsed documents.

When a query is received, the document retrieval machine learning model uses natural language processing modeling to search through the indexed data, identifying the most relevant portions based on the query's content. By leveraging the capabilities of a small LLM, the data platform can perform quick and precise searches, effectively narrowing down vast amounts of data to the most pertinent information. This dual-model approach ensures a robust and efficient retrieval process, combining the strengths of both semantic understanding and rapid indexing.

After the document retrieval process, if the data platform receives no relevant documents in response to the user's query, the data platform sends a message to the user indicating that no information was found. This ensures transparency and manages user expectations by explicitly communicating the lack of results. For instance, if a user queries specific information and the search yields no matching documents, the system generates a response such as, "Sorry, I could not find any information related to your query."

In some embodiments, the documents retrieved by the data platform come with relevancy scores, which help the data platform to assess the retrieved documents' pertinence to the query. The data platform can discard irrelevant documents based on these scores, ensuring that only the most relevant information is presented to the user.

Such discarding can be achieved by applying a minimum threshold score, where documents below a certain relevancy score are excluded. In some embodiments, the platform can retain only the top percentage or a fixed number of the highest-scoring documents. For example, if the search retrieves documents with varying relevancy scores, the system may discard those below a relevancy score of 0.7 or retain only the top 5 documents with the highest scores.

To optimize the document retrieval process, the data platform can process documents by dividing them into chunks of a specific length that the machine learning (ML) model can handle effectively. These chunks serve as the unit of retrieval, meaning the search system retrieves and processes each chunk independently. The data platform or machine learning model, that performs the retrieval, processes each of these chunks to return relevant results. To create these chunks, the data platform determines the appropriate length from the parsed documents and divides the text into contiguous segments of the desired size.

In some embodiments, the data platform creates these chunks by taking contiguous text and forming segments of a particular length that the ML model can manage, ensuring some overlap between chunks. This overlap helps maintain context across chunk boundaries, allowing the retrieval system to understand the continuity of information. This process continues until the entire document is segmented into manageable chunks.

In some embodiments, the data platform leverages the structured nature of documents, such as titles, authors, and abstracts. The data platform can create chunks based on the document's structure. For example, the data platform can create chunks that combine the abstract with the author and title or combine the introduction section with the author and title. This method allows the chunks to maintain their contextual relationships, making it easier for the retrieval system to provide relevant results.

Once the chunks are created and retrieved, the data platform merges chunks that originate from the same document to optimize the response, such as via the chunk merger 418 in FIG. 4.

For a given query, it is beneficial to consider the entire retrieved document rather than isolated chunks. The representation of these chunks from a single document is organized in a tree structure. At the top node, key elements like the title, author, and abstract are included. Below this top node, the tree branches out into sections such as section 1, section 2, and so on. Each section can have its own title, which the system integrates into the overall document structure.

This hierarchical tree representation is beneficial because it allows the data platform to maintain context and relationships within the document. For example, if section 1 mentions "our company received 10× growth" and the original top node indicates "Snowflake quarterly report," the system understands that the 10× growth pertains to Snowflake. This organization helps in providing coherent and contextually accurate responses.

Merging chunks based on the document enhances the system's ability to generate accurate and coherent responses. It simplifies the citation process for the large language model (LLM), as the LLM can reference entire documents rather than isolated chunks (as will be further described herein). This approach ensures that responses are contextually rich and accurate, drawing from the complete information within the document. For instance, when the LLM cites information, the data platform references the entire document, which is more natural and informative than citing fragmented chunks.

Returning to FIG. 3, at operation 312, the data platform generates a RAG context block from the relevant portions of the textual representations. This RAG context block is used by the LLM to provide contextually accurate responses to user prompts.

The generation of the RAG context block begins with the use of a derived representation of the data files, such as a chunk, a textual representation, or a tree structure that organizes the retrieved information. For example, the tree structure, created during the merging of chunks, includes details such as the title, author, abstract, and various sections of the document, maintaining their hierarchical relationships. By leveraging this tree structure, the data platform ensures that the contextual integrity of the information is preserved, making it easier for the LLM to generate coherent and relevant responses.

The RAG context block includes merged chunks of text and their associations with the original documents. Each chunk within the RAG context block is linked back to the document it came from, ensuring that the source of the information is clear, which is later used to maintain the reliability and traceability of the information used in generating responses.

Different models may have varying context limits, often defined by token budgets (the maximum number of tokens or words the model can process in a single interaction). The data platform ensures that the generated RAG context block fits within these context limits. To achieve this, the data platform manages the amount of information included in the RAG context block, balancing between providing sufficient context and staying within the token budget.

Directly adding all the RAG blocks into the LLM is impractical because it would quickly exceed the token budget. Instead, the data platform creates source identifiers for each piece of retrieved information. These identifiers, such as Ref1, Ref2, etc., are used later for citation purposes. This approach allows the LLM to reference the information without overwhelming its processing capabilities with excessive tokens. LLMs can handle simple identifiers more effectively than URLs or links to external documents, ensuring a smoother integration of the RAG context block into the response generation process.

For example, a user queries about a company's quarterly growth report. The data platform retrieves relevant chunks from various sections of a document, such as the title, abstract, and financial sections. These chunks are merged into a tree structure with clear associations to the original document.

The data platform creates a RAG context block that includes the merged chunks and their document identifiers. For instance, the abstract and financial summary blocks can be associated with the document identifier Ref1. The data platform ensures that the combined length of the RAG context block fits within the LLM's token budget.

In some cases, the data platform performs vectorization by transforming the relevant textual portions of unstructured data into mathematical representations, or vectors, that capture the semantic meaning of the text. These vectors enable the data platform to process and manipulate large amounts of text efficiently, making it easier to retrieve relevant chunks and organize them into a coherent structure for further use by the language model (LLM).

In operation 312, when the data platform generates the RAG context block, vectorization is used to represent the textual chunks derived from the unstructured data. By converting these text chunks into vectors, the system can compare and analyze the semantic similarity between different portions of the data, ensuring that the most relevant information is selected for inclusion in the RAG context block.

For instance, the platform may vectorize the title, abstract, and various sections of a document to determine which portions are most relevant to the user's query, selecting those that align best with the query's meaning.

Additionally, vectorization helps the data platform to manage the token budget constraints of the LLM. Since LLMs can have a limited capacity to process tokens (i.e., words or sub-words), vector representations allow the system to group or merge semantically similar chunks while preserving the overall context and meaning. This ensures that the generated RAG context block contains sufficient, meaningful information without exceeding the model's token limit. Vectorization simplifies the process of managing the context by distilling large, unstructured texts into compact, informative vectors that are easier for the system to handle and feed into the LLM.

Moreover, the vector-based approach supports the creation of a tree structure that organizes the textual chunks hierarchically. The vectors associated with the different parts of a document (e.g., title, author, abstract, sections) are used to preserve the relationships between these elements. This hierarchical structure is vital for maintaining the contextual integrity of the information, ensuring that when the LLM generates responses, it does so based on well-organized, contextually relevant information, improving the quality and coherence of the output. In this way, vectorization is a key mechanism that enables the efficient and accurate generation of RAG context blocks for LLM-driven applications.

At operation 314, the data platform inputs the RAG context block into a prompt response machine learning model to receive a response to the first query. The LLM, enhanced with the RAG context block, generates responses for the user.

As shown in FIG. 4, the data platform inputs the RAG context block generated in the previous step into a prompt response machine learning model to receive a response to the first query, ensuring that the RAG context block is effectively utilized to produce an accurate and contextually relevant response.

The RAG context block 420, which contains the relevant portions of the textual representations from the document retrieval process, is inputted into the machine learning model. This context block includes the information that the model will use to generate a response.

The prompt response machine learning model can include an LLM, such as the LLM 422 in FIG. 4, and receives as input the RAG context block. This model is trained to understand and process natural language, making the LLM capable of interpreting the context provided by the RAG block and generating a relevant response.

The LLM uses the contextual information from the RAG block to understand the nuances of the query. This includes recognizing the relationships between different chunks of text and how they relate to the user's query. Leveraging the LLM's training and the provided context, the LLM generates a response that addresses the query.

If the data platform involves multiple prompts or a multiturn conversation, the LLM can take multiple RAG context blocks to maintain continuity and context across turns. In some embodiments, the document retrieval machine learning model already considered the multiturn conversation, and thus, the RAG context block may not have to be generated for each prompt.

Returning to FIG. 3, at operation 316, the data platform displays the response to the first query to the first user. Once the response has been generated by the machine learning model, the data platform integrates the response into a user interface (UI) of the data platform. The UI displays the response to the query to the first user, such as in the chat message that is configured to receive prompts from the first user.

Systems and methods described herein include training a machine learning network, such as training to execute a query from a user. The machine learning network can be trained to rewrite a query to generate a modified query, identify relevant documents from a query, generate a response from RAG blocks, and/or the like. The machine learning algorithm can be trained using historical information that include historical user queries, and resulting prompt responses.

Training of models, such as artificial intelligence models, is necessarily rooted in computer technology, and improves modeling technology by using training data to train such models and thereafter applying the models to new inputs to make inferences on the new inputs. Here, the new inputs can be a new prompts from a user. The trained machine learning model can determine a response to the new prompt received from the user.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new prompt or query data) and make predictions that the model was trained for based on the weights or scores that were adjusted during training. Such training of the machine learning models described herein reduces false positives and increases the performance to rewrite a query to generate a modified query, identify relevant documents from a query, generate a response from RAG blocks, and/or the like.

Although examples described herein explain the features in certain order, such as generating textual representations when the data files are received, it is appreciated that such features can be applied in different stages, such as indexing unstructured data in response to a query that requires the application of an AI module. Another example is that certain features such as chunking, vectorizing, and RAG content block generating is performed after document retrieval, it is appreciated that such features can be performed upon receipt of the data files.

Figure 5:
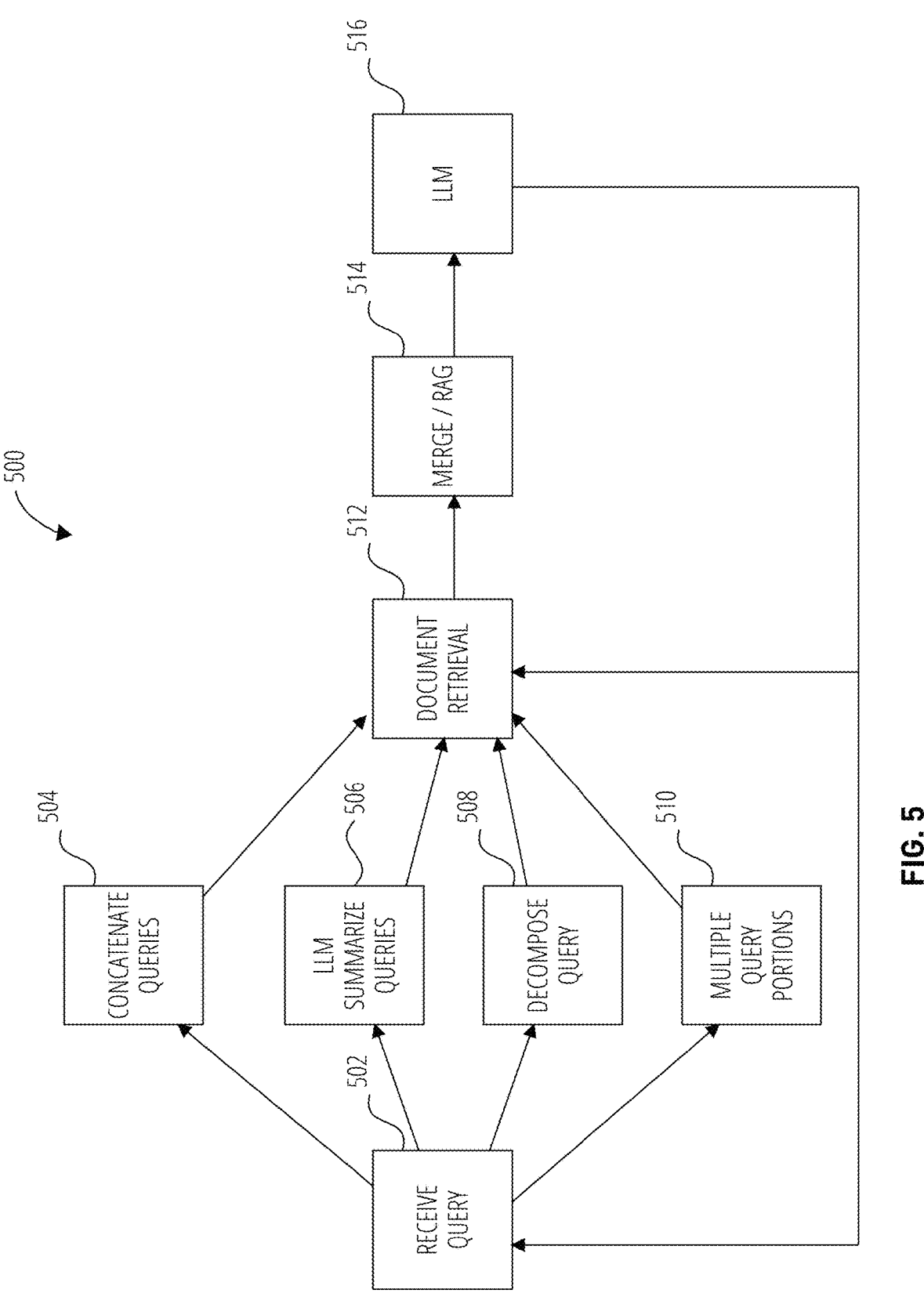
FIG. 5 illustrates an architectural diagram illustrating alternative processes for mitigating or eliminating hallucinations during query execution, in accordance with some embodiments.

FIG. 5 illustrates an architectural diagram 500 illustrating alternative processes for mitigating or eliminating hallucinations during query execution, in accordance with some embodiments. The data platform can receive a query 502 by providing a user-friendly interface, such as a chat window or search bar, where users can input their questions or prompts.

After receiving a query, the data platform can perform several key processes to prepare for document retrieval. These processes can include parsing the query to understand its intent and context, categorizing the query to determine if it requires external data retrieval or can be answered directly, and assessing the query for any necessary modifications or refinements. The platform may also involve analyzing prior prompts and user interactions to maintain continuity in multi-turn conversations, classifying the query into relevant categories (e.g., pleasantry, dataset-specific question, or general knowledge), and generating a modified query optimized for document retrieval.

Although certain processes are described, it is appreciated that all or any subset of such processes can be combined in series or in parallel, such as to prepare a query for document retrieval.

To handle queries over multiple turns, the data platform can either concatenate the queries 504 or use an LLM to summarize them 506 (as further described herein). Concatenation can include combining a set number of previous queries and responses into a single, comprehensive query string, maintaining the conversational context. Furthermore, an LLM can summarize the previous interactions by extracting key information and context, creating a succinct yet informative summary that preserves the essence of the conversation. This summarized query can then be used for further processing, ensuring that the multi-turn context is efficiently maintained without overwhelming the system with excessive information.

In some cases, the data platform decomposes received queries 508. The data platform performs query decomposition to enhance the precision and relevance of document retrieval by decomposing queries and identifying relationships between such queries.

The data platform identifies and understands the differences among the queries to distinguish the unique aspects of each query, which may represent evolving user needs or different facets of a broader question.

For instance, a user might start with a general query and then follow up with more specific questions as they seek deeper insights. By capturing these differences, the platform ensures that each unique aspect is addressed, providing a comprehensive response.

Finally, the platform combines the identified similarities and differences into a single, refined query. This combined query effectively encapsulates the context and intent of the user's multi-turn interaction, balancing the need for detail with the necessity of clarity. In some cases, the data platform applies natural language processing and/or machine learning in the query decomposition process.

In some cases, the data platform modifies the latest query provided by the user to retrieve relevant documents. The data platform modifies the latest query to include context using prior queries and prompts by the user (as further described herein). Then the document retrieval process uses the latest query and the contextual information to retrieve the relevant documents.

In some cases, the data platform can enhance the efficiency and relevance of search results by splitting a single query into multiple portions 510. The data platform can break down the original search query into several sub-queries. The data platform can divide the query into each sub-query that focuses on a specific aspect or component of the original query, allowing for a more targeted search. This decomposition can be based on different criteria such as keywords, topics, or distinct informational needs identified within the initial query.

Once the query is split, these sub-queries can be issued in parallel to the document retrieval system. By doing this, the platform can leverage the power of concurrent processing to obtain search results more quickly and efficiently. Each sub-query retrieves a set of results that pertain to its specific focus. After all sub-query results are returned, the data platform employs machine learning logic to analyze and evaluate the relevance of these results. This analysis can identify which individual results or combination of results best address the original query's intent.

The data platform can then select the most relevant results from the individual sub-queries and/or combining information from multiple results to form a comprehensive response. By using this approach, the data platform ensures that the final response is both comprehensive and highly relevant, leveraging the strengths of parallel processing and advanced machine learning to enhance query handling and document retrieval.

The data platform can retrieve relevant documents 512, excerpts, or textual representations of data files, merge chunks and generate RAG context blocks 514, and input such context blocks into an LLM to generate a response for the user 516 (as further described herein).

Upon receiving the RAG content files (or chunks or other textual representations), the LLM first processes these inputs to understand their content and relevance. The LLM determines if the information adequately addresses the user's prompt, leveraging its deep understanding of language and context.

During this assessment, the LLM evaluates the completeness, accuracy, and relevance of the information contained within the received documents. The LLM checks if the key aspects of the user's query are covered and whether the retrieved documents provide a coherent and comprehensive response. If the LLM determines that the existing information is insufficient, the LLM can perform certain steps to ensure an accurate and thorough answer.

One option is to trigger additional document retrieval. The LLM can identify specific gaps in the information and issue further queries to the document retrieval system, seeking out more relevant documents that can fill these gaps. This iterative process ensures that the LLM accumulates a robust dataset before generating a final response.

Alternatively, the LLM can engage with the user directly by asking clarifying questions. This interaction helps refine the query and gather more precise details, ensuring that subsequent document retrievals are better aligned with the user's informational needs. By requesting additional input from the user, the LLM can tailor the search process more effectively, improving the relevance and quality of the final answer.

FIG. 6 illustrates an example method 600 for executing a query and generating citations with safeguards against hallucinations, in accordance with some embodiments. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at sub-stantially the same time or in a specific sequence.

At operation 602, the data platform generates textual representations of data files by parsing and categorizing text of the data files. For example, the data platform can perform one or more features described for operation 302.

At operation 604, the data platform initiates a chat mes-sage comprising a user interface configured to receive prompts from a first user. For example, the data platform can perform one or more features described for operation 304.

At operation 606, the data platform receives a first query from the first user via the user interface. For example, the data platform can perform one or more features described for operation 306. In some cases, the data platform receives a query and the response with the citation is performed on a single query. In other cases, the data platform assesses the query over multiple turns to gather context, as described in FIG. 3.

At operation 608, the data platform assesses data corre-sponding to the first query to identify relevant portions of the textual representations. For example, the data platform can perform one or more features described for operations 308 and 310.

At operation 610, the data platform generates a RAG context block from the relevant portions of the textual representations. The RAG context block can include data representing the relevant portions of the textual representa-tions and an identifier corresponding to a source address of a first data file corresponding to the relevant portions. For example, the data platform can perform one or more features described for operation 312.

At operation 612, the data platform inputs the RAG context block into a prompt response machine learning model to receive a response to the first query. The prompt response machine learning model is trained to generate responses to queries based on inputted RAG context blocks. For example, the data platform can perform one or more features described for operation 314.

At operation 614, the data platform inputs the RAG context block and the response to the first query into a citation machine learning model to receive a citation for the response. The citation machine learning model is trained to generate citations based on inputted RAG context blocks and responses.

The data platform employs a separate citations machine learning model specifically designed to generate accurate citations for the responses generated by the prompt response machine learning model. This model operates by taking the response produced for the user's query and the associated RAG context block as inputs.

The data platform sends the response from the prompt response machine learning model along with the corre-sponding RAG context block to the citations machine learn-ing model. The RAG context block contains the relevant portions of the textual representations and reference identi-fiers linking back to the original data files.

The citations machine learning model assesses the RAG context block. The citations machine learning model ana-lyzes the structure of the RAG context block to understand which segments of the retrieved documents were used to construct the response, by identifying the source of the information and correlating it with the reference identifiers present in the RAG context block.

Utilizing its training, the citations machine learning model generates citations by mapping the information in the response to its original sources. The model ensures that each piece of information in the response is accurately attributed to its source document.

The citations model also makes use of the reference identifiers included in the RAG context block. These iden-tifiers (e.g., Ref1, Ref2, etc.) act as placeholders that link back to the original data files. The model integrates these identifiers into the citations to ensure that users can trace the information back to its primary source easily.

Once the citations are generated, the data platform incor-porates them into the response. This can involve appending a list of references at the end of the response or embedding inline citations within the text of the response itself.

The data platform can generate citations in one or more different formats to enhance user experience and ensure the traceability of information. For example, the data platform can generate abridged citations that are links selectable by the user, or full citations with the actual location address of the data file.

The citations machine learning model generates a simpli-fied version of the citation. Instead of providing the full reference, the citations machine learning model creates a shorter, more user-friendly version that serves as a clickable link. For example, an abridged citation may include "[Ref1]" or "[1]".

The citations machine learning model can embed the abridged citations with hyperlinks within the response. When a user clicks on the link, the data platform dynami-cally displays the excerpt or relevant portion of the docu-ment from which the information was derived. This can be achieved using a pop-up window, tooltip, or side panel that shows the excerpt without navigating away from the current view.

The backend data platform stores the mapping between the abridged citations (e.g., Ref1, Ref2) and the actual excerpts or document segments. When a user clicks on the link, the data platform retrieves and displays the correspond-ing excerpt from the database or document storage.

In some cases, the citations machine learning model generates full citations that include the complete location address of the data file. This could be a URL, file path, or database reference that directly points to the source docu-ment. These full citations can be appended to the response or embedded inline. For instance, a full citation may include "[https://company.com/reports/quarterly2023.pdf]".

Figure 7:
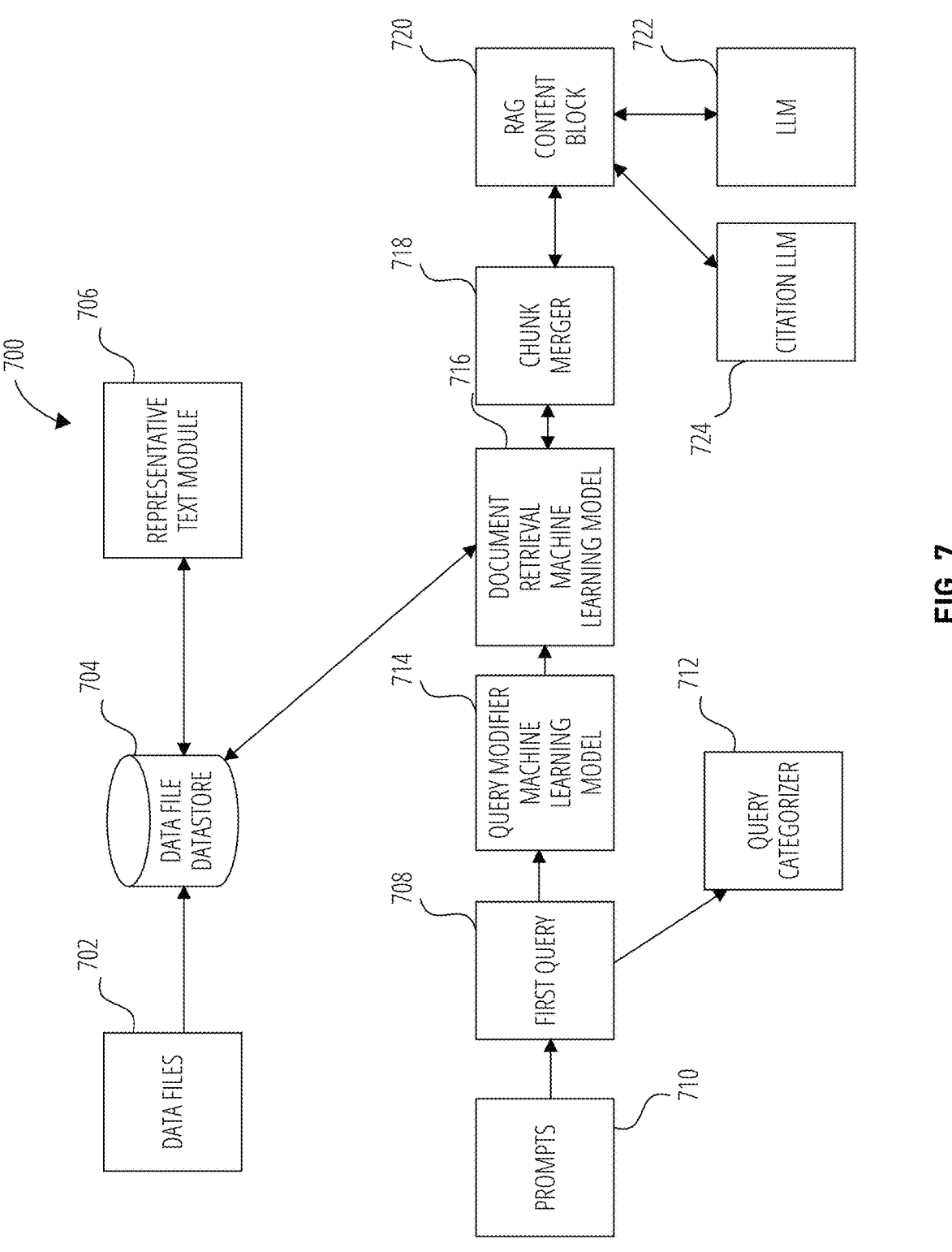
FIG. 7 is an architectural diagram illustrating a process for mitigating or eliminating hallucinations during query execution and citation generation, in accordance with some embodiments.

FIG. 7 is an architectural diagram 700 illustrating a process for mitigating or eliminating hallucinations during query execution and citation generation, in accordance with some embodiments. The data platform can apply a citation machine learning model, such as a citation LLM 724. Certain features of FIG. 7 may include features described for FIG. 4. For example, the data files 702 may include features of data files 402, data file datastore 704 may include features of data file datastore 404, representative text module 706 may include features of representative text module 406, prompts 710 may include features of prompt 410, first query 708 may include features of first query 408, query modifier machine learning model 714 may include features of query modifier machine learning model 414, query categorizer 712 may include features of query categorizer 712, document retrieval machine learning model 716 may include features of document retrieval machine learning model 416, chunk merger 718 may include features of chunk merger 418, rag content block 720 may include features of rag content block 420, and LLM 722 may include features of LLM 422.

Returning to FIG. 6, at operation 616, the data platform displays the response to the first query and the corresponding citation to the first user. For example, the data platform can perform one or more features described for operation 316.

FIG. 8 is an architectural diagram illustrating corrections to incorrect citations, in accordance with some embodiments. If the citation generated by the citation LLM 804 is incorrect, indicating a mismatch or hallucination (where the source ID does not match the expected reference or the source address is incorrect), the data platform can perform one or more processes to correct such errors.

In some embodiments, the data platform identifies the incorrect citation and removes all associated results 806 from the document that caused the error, providing a quick method to ensure that the response does not include potentially misleading or incorrect information. This allows the platform to provide a more accurate response without the problematic document. For example, if the original response was "Sales increased by 20% last quarter [Ref1], whereas revenue has decreased by 5% [Ref2]," and Ref1 is identified as incorrect, the response would be updated to "Sales increased by 20% last quarter, whereas revenue has decreased by 5% [Ref2]" without a citation or the response is updated to "Revenue has decreased by 5% [Ref2]."

In some embodiments, the data platform excludes the problematic document and reruns 808 the prompt through the prompt response LLM 802 to generate a new response. By removing the influence of the erroneous document, the LLM can generate a response based solely on accurate sources. This ensures that the new response is derived from a more reliable set of documents and helps to generate a comprehensive response without the risk of including incorrect information.

In some embodiments, the data platform initiates another data retrieval operation, querying the API again to fetch the correct documents that were supposed to support the initial response 810. In some cases, the input to the data retrieval machine learning model is the same, just rerun again. In some cases, the input to the data retrieval machine learning model is modified, such as by removing the related portion of the modified prompt that may have caused the incorrect citation or by rerunning the LLM that is rewriting the query to generate the modified query.

In some embodiments, the data platform reprocesses the response through the citation LLM 812 to correct the citation by reassessing the RAG context block and aligning it with the appropriate references. The citation LLM can rerun the citation generation with the RAG context block and the output of the prompt response LLM to potentially rectify any citation errors without altering the main content of the response.

In some cases, the data platform uses separate machine learning models (such as LLMs) for generating query responses and citations by running these models either in parallel or in series. In parallel execution, both the prompt response LLM and the citation LLM run simultaneously. The query response LLM generates an answer to the user's prompt while the citation LLM concurrently works on identifying the correct sources and generating citations for the response.

In series execution, the prompt response LLM first generates the answer to the query. Once the response is ready, the citation LLM then processes this response to generate accurate citations.

In some cases, the data platform uses a lightweight embedding model that creates vector representations of words or phrases, capturing their semantic meaning in a compact form. In some cases, the data platform uses a natural language inference (NLI) model that determines the relationship between different pieces of text, such as whether one text logically follows from another. The model assesses whether the response provided by the prompt response LLM is supported by the cited sources.

The citation LLM can evaluate whether specific sources actually support the response given by the query response LLM by cross-referencing the information in the response with the content of the cited documents to verify accuracy. In some cases, the citation LLM checks the citing of every single sentence. In some cases, the citation LLM selectively identifies key parts of the response that require citations.

The data platform generates citations in real time by the citation LLM as the prompt response LLM generates the response. In traditional systems, citations are generated only after the entire response has been produced by the prompt response LLM. This approach results in a delay, as the citation process cannot begin until the full response is available, leading to a poorer user experience due to the wait time.

The embodiments described herein include generating citations in real-time as part of the streaming response. As the prompt response LLM generates the response, the text is simultaneously sent to the citation LLM. The citation LLM works in parallel to identify correct citations for each character, word, or sentence as they are generated.

The prompt response LLM can send portions of the generated text to the citation LLM at different granularity levels, such as per character, per sentence, or every 2-3 sentences. The citation LLM processes these portions to identify and attach relevant citations in real-time.

If the citation LLM initially identifies a citation based on limited information, the citation LLM can correct this citation as more context becomes available from the prompt response LLM. If the initial text suggests a particular source but subsequent information indicates a different, more accurate source, the citation LLM can update the citation accordingly.

FIG. 9 is an architectural diagram illustrating simultaneous parallel processing by the citation LLM with the prompt response LLM, in accordance with some embodiments. The citation LLM 904 initially identifies a citation but then updates it as more information becomes available from the prompt response LLM. For example, a user inputs a query: "What is the impact of climate change on polar bear populations?"

The prompt response LLM 902 starts generating the response: "Climate change has a significant impact on polar bear populations. According to various studies, polar bears are experiencing habitat loss due to melting sea ice." 906. As the first sentence is generated, the citation LLM identifies a potential source: "Climate Change and Polar Bears," 908 an article from a general news website, because it matches the initial content about climate change and polar bears.

However, the prompt response LLM continues: "Specifically, the 2021 report by the World Wildlife Fund (WWF) highlights that polar bear populations have decreased by 30% in the last decade due to reduced hunting grounds and food shortages." 910. With the additional context, the citation LLM now recognizes that the initial source may not be as authoritative as the WWF report. The citation LLM updates the citation to: "World Wildlife Fund (2021), Polar Bear Populations Report." 912.

By implementing real-time parallel processing for citation generation, the system significantly improves the responsiveness and accuracy of the information provided, resulting in a more engaging and informative user experience.

If the prompt response LLM has already generated text for one concept and moved on to the next while the citation LLM is still running, the data system can decide whether to go back and update the citation or pause until the citation process catches up. The data platform can allow the citation LLM to update citations for previously generated text if more accurate information becomes available. Alternatively, the data platform can pause the generation of new text until the citation process for the current section is complete, ensuring consistency between the response and citations.

In order to ensure accurate citations in the generated responses, the data platform employs certain processes to check citations. In one embodiment, the data platform employs regex matching. The prompt response LLM generates the response by directly incorporating exact excerpts from the retrieved documents. This ensures that the generated content matches the original source word-for-word.

After the response is generated, the citation LLM employs a regex matching algorithm that is used to scan the response and match it against the retrieved documents' textual representations. The regex matching identifies the precise location of the excerpts in the source documents, verifying that the response content is accurately sourced. In some cases, the regex matching algorithm is executed external to the citation LLM. In some cases, the regex matching algorithm is executed within the citation LLM.

In some cases, the prompt response LLM generates a comprehensive and coherent response, which may not be a word-for-word excerpt from the retrieved documents but rather a synthesized answer. The citation LLM then analyzes the generated response and infers which documents the information most likely came from. This model evaluates the relevance and similarity between the response content and the retrieved documents, making educated guesses about the sources.

In some cases, the data platform enables direct communication between the prompt response LLM and the citation LLM. The prompt response LLM and the citation LLM communicate directly with each other during the response generation process.

As the prompt response LLM generates the response, it sends the partially completed response to the citation LLM. The citation LLM then analyzes the content and returns the inferred citations back to the prompt response LLM. The prompt response LLM incorporates these citations into the response as it continues to generate the text.

In some embodiments, both the response generated by the prompt response LLM and the inferred citations from the citation LLM are sent to the data platform. The data platform then combines the response and the citations to generate the final output. In this approach, the data platform acts as an intermediary, ensuring that the citations are accurately matched to the corresponding parts of the response.

Regardless of the approach, the accuracy of the citations can be verified at multiple points in the process. The prompt response LLM, the citation LLM, or the data platform can all be involved in ensuring that the citations are correct. For instance, the prompt response LLM can re-evaluate its generated text to ensure it aligns with the cited sources, while the citation LLM can double-check the relevance and accuracy of the inferred citations. The data platform can also perform additional checks to confirm the validity of the citations before finalizing the response.

When integrating citations into responses generated by LLMs, the data platform can maintain clean and consistent formatting. The data platform can apply cleaning or clipping on the citations, such as to discard unwanted endnotes or maintain formatting. The data platform intercepts the generated text stream and applies specific rules or patterns to remove or format parts of the text that are not desired.

LLMs often do not consistently cite sources with a standardized format, which can lead to issues with markdown parsing or result in an aesthetically unappealing presentation. Markdown parsing converts the syntax used by the LLM into HTML for web display, and inconsistencies in citation formats can disrupt this process, leading to errors or visual clutter.

In the updated approach, the system intercepts the text stream mid-flight—meaning while the response is being generated—to clean up and discard unwanted output. This could include unnecessary endnotes, bibliographies at the end of the response, or extra headings and citation schemes that are not part of the desired format. The data platform can identify and remove these unwanted elements via clipping or cleaning of citations to match formatting across all citations.

Figure 10:
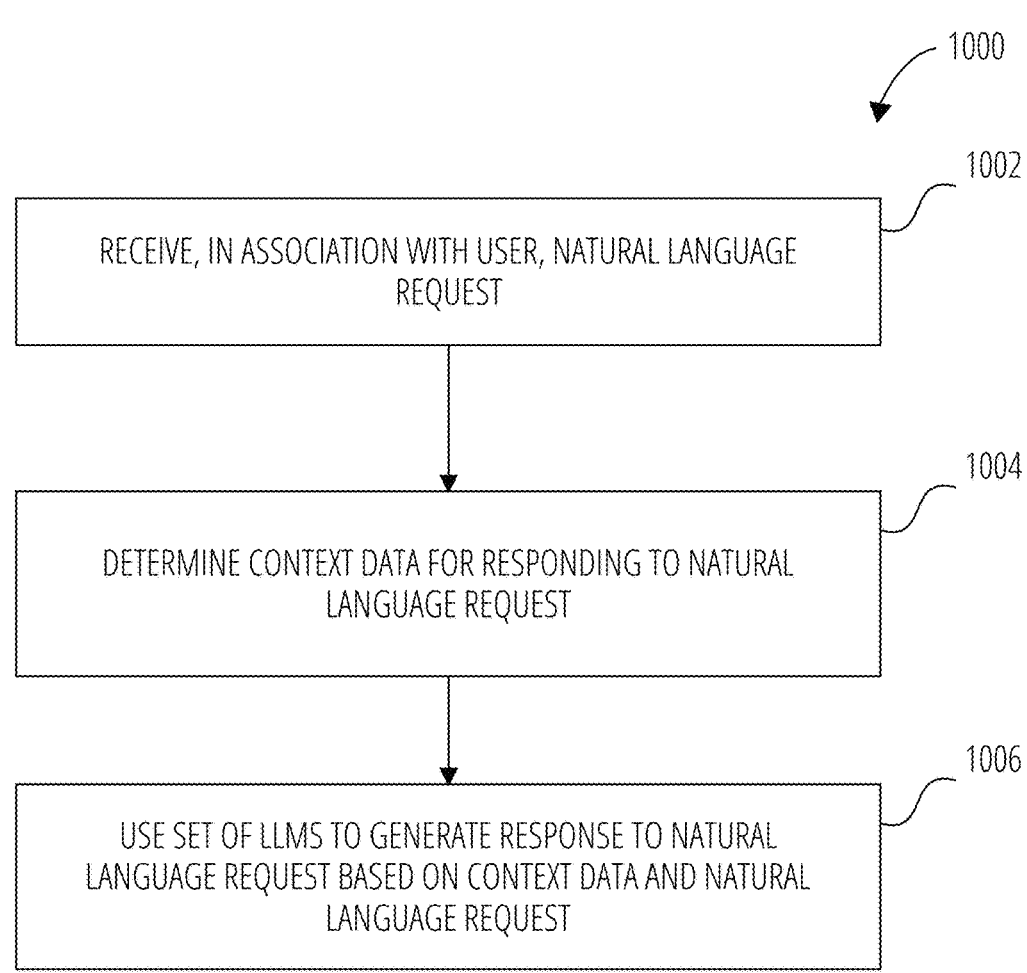

FIG. 10 and FIG. 11 are flowcharts of example methods 1000, 1100 for generating a structured language data query based on a natural language question and context data relating to a schema of a datastore, in accordance with some embodiments of the present disclosure. Any of methods 1000, 1100 may be embodied in computer-readable instructions for execution by one or more hardware components (e.g., one or more processors) such that the operations of any of methods 1000, 1100 can be performed by components of the cloud data platform 102, such as a network node (e.g., the cloud data platform 102 executing on a network node of the compute service manager 108) or a computing device (e.g., client device 112), one or both of which may be implemented as machine of FIG. 16 performing the disclosed functions. Accordingly, methods 1000, 1100 are described below, by way of example with reference thereto. However, it shall be appreciated that any of methods 1000, 1100 may be deployed on various other hardware configurations and is not intended to be limited to deployment within the cloud data platform 102.

At operation 1002, a hardware processor (e.g., implementing the cloud data platform 102) receives, in association with a user, a natural language request. Additionally, at operation 1002, the hardware processor can receive, in association with the user, a selection of a schema. Depending on the embodiment, the selection of the schema can be performed by a user (e.g., a user entering the selection via a graphical user interface for an artificial intelligence-based assistant) or, alternatively, can be automatically performed by a process that selects the schema based on the natural language request (e.g., based on the natural language request). Where the schema is automatically selected based on the natural language request, a user would not need to perform or otherwise provide a selection of the schema.

During operation 1004, the hardware processor (e.g., implementing the cloud data platform 102) determines (e.g., generates or identifies) context data for responding to the natural language request. For some embodiments, the context data comprises metadata associated with the schema (specified by the selection). Additionally, for some embodiments, the context data comprises a set of text from chat history data associated with the user (e.g., the last 15 messages from user's chat with the AI-based assistant). According to some embodiments, operation 1004 comprises performing a search (e.g., using a search component), on a metadata datastore, for the metadata associated with the schema, where the search can be performed using a query string, and receiving a result to the search, where the result comprises the metadata. The query string can comprise one or more of: the natural language request; a set of text from the chat history data (e.g., a concatenated list of chat text or past messages); information from the schema; or information regarding the user (e.g., user's username, role, organization, privileges, access, etc.). The search can be facilitated by a search component, such as a catalog search service, which can provide relevant table names and relevant columns based on a query string. The search component can enable an embodiment to operate in databases and schemas with large numbers of tables, which would otherwise be challenging to operate in given the finite size of the context window in the underlying one or more LLMs. The search component can be accessed, for example, by way of an application programming interface (API) (e.g., which can receive a query string which can receive a query string, identification of the schema as search scope, at least some portion of chat history, or some combination thereof). The search component can search both stored metadata (e.g., on a metadata datastore) and one or more stored documents (e.g., documentation for a data system).

Depending on the embodiment, the metadata can comprise information (e.g., name, description of structure, data types, entity relationships, etc.) regarding at least one of: a datastore; one or more tables on the datastore and relevant to the query string; one or more columns on the datastore and relevant to the query string; or one or more views on the datastore and relevant to the query string. Metadata can comprise a comment (e.g., user comment), which can be associated with at least one datastore, table, view or column identified as being relevant to the query string. A user comment can comprise an annotation added to an object on a data platform, which can include a user object, a role object, a data warehouse object, a database object, a table object, or a column object. Metadata can comprise a tag, which can be associated with at least one datastore, table, view or column identified as being relevant to the query string. A tag can be associated with an object on a data platform and permit a user to monitor sensitive data for compliance, discovery, protection, or resource usage use cases (e.g., through either a centralized or decentralized data governance management approach).

For some embodiments, the context data comprises a set of sample values for one or more columns described by the schema or for one or more columns of one or more elements described by the schema, such one or more tables or one or more views identified in the metadata provided by the search operation. The sample values of columns can comprise performing a SHOW SQL query to fetch all tables or views in the schema accessible to the user, performing a SQL query to fetch the sample values from the fetched tables or views, and filtering down the results to the relevant tables and columns identified in the metadata provided by the search operation.

For some embodiments, the context data comprises a structured language data query history associated with the user. In this way, the user's historical queries can be used as a predictor for structured language data queries that the user will want to write in the future. Additionally, for some embodiments, the context data comprises user feedback data associated with the user. The user feedback data can comprise, for example, feedback that the user provides as the user interacts (e.g., converses) with an AI-based assistant, which can include positive or negative feedback indicators the user provides in connection with a prior response generated by the AI-based assistant. Some embodiments identify and extract this user feedback and generate a repository that contains all the feedback the user provides over time.

For some embodiments, the context data comprises information from verified query repository data (e.g., stored on a verified query repository accessible to the user), where the verified query repository data comprises one or more individual structured language queries paired with natural language descriptions of the individual structured language queries. A user (or the user's organization) can build and maintain a repository of "verified structured language data queries" for the user's (or the organization's use), where each of the verified structured language data queries has a clear natural language description that has been submitted by the user. According to some embodiments, a set of workflows is implemented that permits one or more users (e.g., of an organization) to submit verified structured language data queries to a repository (e.g., associated with the organization). For instance, a user can be able to add a verified structured language data query from a conversation with an AI-based assistant, or directly from a structured language data query history. In the course of adding a verified structured language data query, some embodiments can distill a prior conversation into a natural language request (e.g., natural language question) to pair with a structured language data query or include any relevant feedback that a user had in the course of the conversation as an attachment to the verified structured language data query. The natural language description-structured language data query pairs stored in the repository can encode a variety of information (e.g., organizational knowledge) that can be used as context data for a structured language data query generator as described herein.

For some embodiments, the context data comprises a set of custom instructions or pre-instructions provided by the user. Through the set of custom instructions or pre-instructions, the user can share a set of preferences or specific knowledge (e.g., business knowledge) with the structured language data query generator, which the structured language data query generator can consider (as context) during generation of one or more subsequent responses for the user.

For some embodiments, the context data comprises auto-generated metadata, which can include automatically generated data classification information (e.g., extracted from scans of user data and metadata). The data classification information can comprise a data description of the data content, detailed data format, and variant column schema. Auto-generated metadata can also include data describing a top X number of distinct values for each column of a relevant table or view, which can be used as sample data by the structured language data query generator.

For some embodiments, the context data comprises a set of curated views (e.g., curated by one or more users in an organization). An individual view in the set of curated views can use descriptive and easy-to-understand names for their columns (e.g., the names based on business and data taxonomy likely to be used while using an AI-based assistant), comprise columns having appropriate data type, define commonly used metrics/expressions as new columns, and capture common or complex joins.

For some embodiments, the context data comprises context information provided by a software application external to the AI-based assistant. For example, where the AI-based assistant is invoked and displayed within a software application environment, the software application environment can provide context information (e.g., "product surface" context), such as content (e.g., content data from a data worksheet or data notebook).

For operation 1006, the hardware processor (e.g., implementing the cloud data platform 102) uses a set of large language models to generate a response to the natural language request based on the context data and the natural language request. For some embodiments, the context data and the natural language request are used as input to the set of large language models to generate the response. For some embodiments, the response comprises a structured language data query for (e.g., SQL query configured for execution on) a datastore (e.g., database), and a natural language explanation of the structured language data query. For various embodiments, the set of large language models comprises a chain of large language models (e.g., two or more large language models), where a first large language model of the chain of large language models generates a first output based on a first input (e.g., first prompt) that comprises the natural language request and the context data, and where a second large language model of the chain of large language models generates a second output based on a second input (e.g., second prompt) that comprises the natural language request and the first output from the first large language model. The second large language model can receive at least a portion of the context data, additional context data (e.g., determined specifically for the second large language model), or a combination of both. An individual large language model in the set of large language models can receive, as input, a set of instructions specific to the individual large language model; the set of instructions can instruct the individual large language model to perform its intended function/purpose within the set of large language models.

Referring now to FIG. 11, at operation 1102, a hardware processor (e.g., implementing the cloud data platform 102) causes presentation of a graphical user interface for an artificial intelligence-based assistant. For some embodiments, the graphical user interface for the artificial intelligence-based assistant is presented within a software application environment (e.g., IDE), where the context data can comprise information regarding a current context of the software application environment (e.g., current data content being displayed in graphical user interface of the software application environment). For some embodiments, the selection of the schema is received from the user by the graphical user interface, and the natural language request is received from the user by the graphical user interface.

At operation 1104, the hardware processor (e.g., implementing the cloud data platform 102) determines a set of accessible schemas accessible to the user. For operation 1106, the hardware processor (e.g., implementing the cloud data platform 102) provides the set of accessible schemas for selection by the user via the graphical user interface, where the selection of the schema (e.g., via the graphical user interface) is selected from the set of accessible schemas.

After operation 1106, operations 1108 through 1112 are performed. For some embodiments, operations 1108, 1110, 1112 are respectively similar to operations 1002, 1004, 1006 of method 1000 described and illustrated with respect to FIG. 10.

At operation 1114, the hardware processor (e.g., implementing the cloud data platform 102) causes presentation of the response in the graphical user interface of the AI-based assistant and, at operation 1116, the hardware processor (e.g., implementing the cloud data platform 102) causes presentation of a graphical user interface element (e.g., graphical user interface button) in the graphical user interface of the AI-based assistant. For some embodiments, the graphical user interface element is configured to cause, upon selection of the graphical user interface element by the user:

execution of the structured language data query on the datastore; and display of a query result in the graphical user interface, where the query result is received in response to the execution of the structured language data query.

For various embodiments, the graphical user interface for the artificial intelligence-based assistant is presented as a first graphical user interface within a software application environment. A graphical user interface element (presented in the first graphical user interface) can be configured to cause, upon selection of the graphical user interface element by the user, insertion of the structured language data query from the response to a second graphical user interface of the software application environment, where the second graphical user interface is external to the first graphical user interface of the artificial intelligence-based assistant. Additionally or alternatively, a graphical user interface element (presented in the first graphical user interface) can be configured to cause, upon selection of the graphical user interface element by the user: execution of the structured language data query on the datastore; and display of a query result in a second graphical user interface of the software application environment, where the second graphical user interface is external to the first graphical user interface of the artificial intelligence-based assistant, and where the query result is received in response to the execution of the structured language data query.

Figure 12:
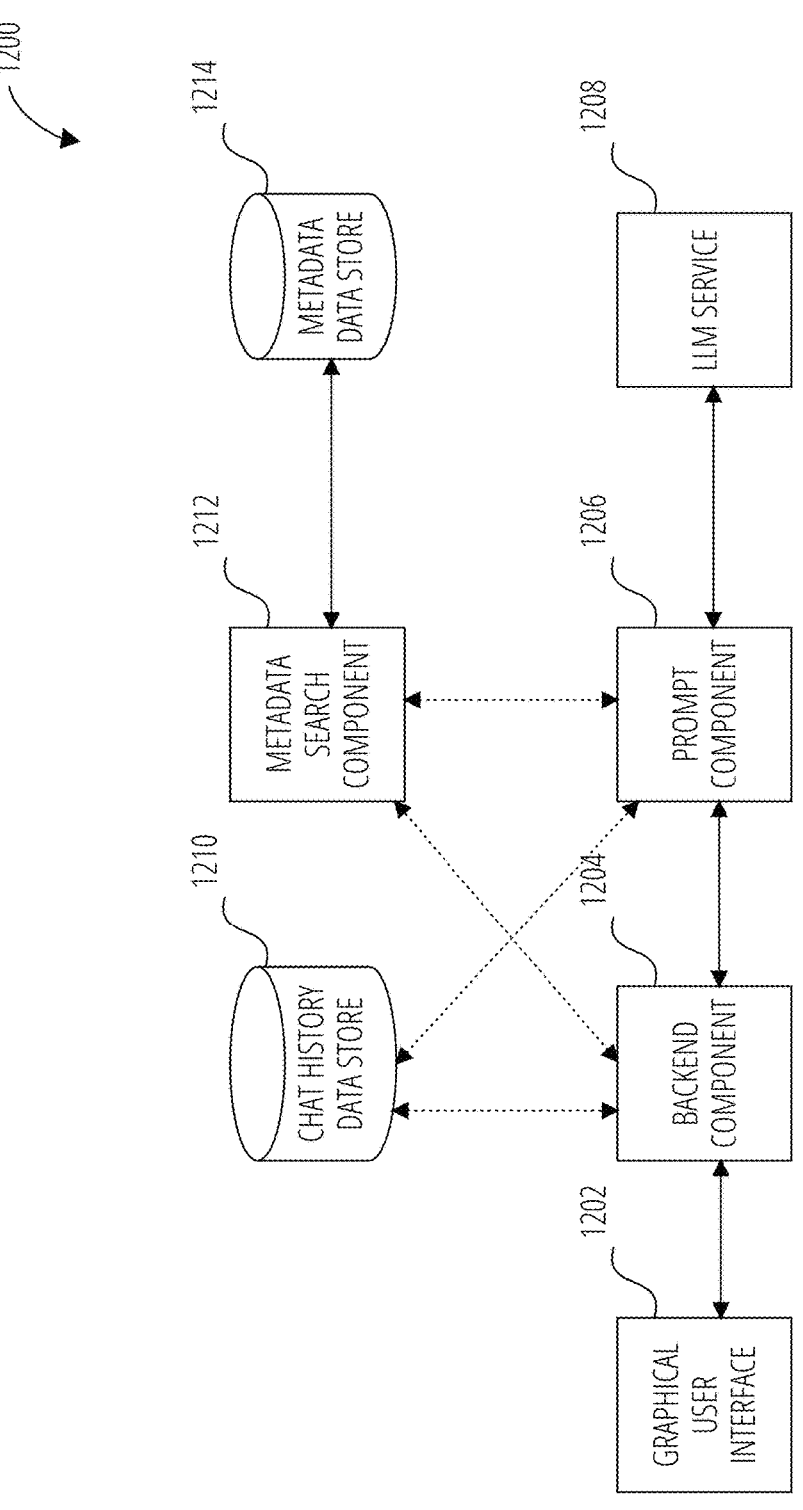
FIG. 12 is a flowchart of an example method for generating a structured language data query based on a natural language question and context data relating to a schema of a datastore, in accordance with some embodiments of the present disclosure.

FIG. 12 is a diagram illustrating an example artificial intelligence (AI)-based assistant system 1200, in accordance with some embodiments of the present disclosure. As shown, the AI-based assistant system 1200 comprises a graphical user interface 1202, a backend component 1204, a prompting component 1206, a large language model service 1208, a chat history datastore 1210, a metadata search component 1212, and a metadata datastore 1214. The graphical user interface 1202 can implement or otherwise support a graphical user interface of an AI-based assistant. Depending on the embodiment, the graphical user interface of an AI-based assistant can be invoked and displayed as a standalone software application, or can be invoked and displayed within a software application environment (e.g., IDE), which can represent a front-end or downstream software application. The graphical user interface 1202 exchanged data with the backend component 1204, which can facilitate interactions between a user accessing the graphical user interface 1202 and the remainder of the AI-based assistant system 1200. During operation of the AI-based assistant system 1200, a user can submit a selection of a schema and a natural language request to the AI-based assistant system 1200 by way of the graphical user interface 1202. The backend component 1204 can receive the selection of the schema and the natural language request and, subsequently, the backend component 1204, the prompting component 1206, or both retrieve chat history data associated with the user from the chat history datastore 1210. Additionally, the backend component 1204, the prompting component 1206, or both determine context data as described herein, which can comprise using the metadata search component 1212 to search the metadata datastore 1214 for metadata based on a query string. As described herein, the query string can comprise one or more of user information (e.g., user's role, user's access privileges, user's organization, etc.), a set of text from the chat history data associated with the user and retrieved from the chat history datastore 1210, and the natural language request. The metadata provided by the metadata search component 1212 can represent metadata relevant to responding to the natural language request.

The large language model service 1208 can provide the AI-based assistant system 1200 with access to one or more large language models. The prompting component 1206 uses a set of large language models, accessible through the large language model service 1208, to generate a response to the natural language request based on the context data and the natural language request. As described herein, the response can comprise a structured language data query (e.g., SQL) that can be performed on a datastore (e.g., database) to obtain a query response or to modify or add stored data to the datastore (per the user's natural language request), and a natural language explanation of the structured language data query, where the natural language explanation can explain or detail how the structured language data query operates and what result the structured language data query aims to achieve. Eventually, the response is generated and provided by the large language model service 1208, and the response is returned (e.g., displayed) to the user through the graphical user interface 1202 (by way of the prompting component 1206 and the backend component 1204).

Figure 13:
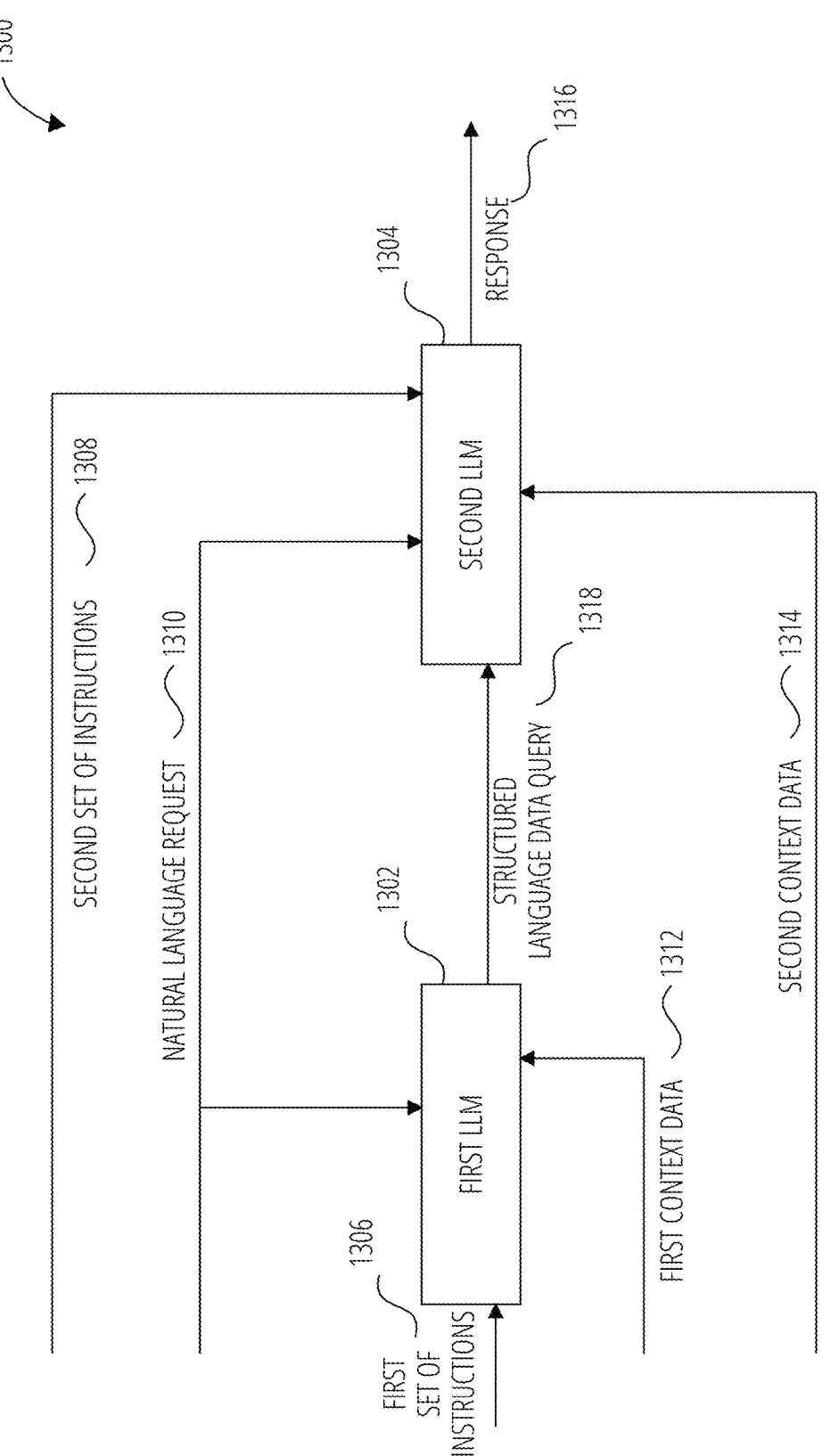
FIG. 13 is a diagram illustrating an example chain of large language models 1300, in accordance with some embodiments of the present disclosure.

FIG. 13 is a diagram illustrating an example chain of large language models 1300, in accordance with some embodiments of the present disclosure. As shown, the chain of large language models 1300 comprises a first large language model (LLM) 1302 and a second large language model (LLM) 1304. Though FIG. 13 illustrates the chain of large language models 1300 with two large language models chained together, for some embodiments, three or more large language models are chained together. An output of a large language model in the chain can be received by a next/subsequent large language model in the chain as input, and a last large language model in the chain can generate the response. Each of one or more large language models in the chain can serve a different purpose or functionality. For example, one large language model in the chain can be trained, fine-tuned, or well-suited for natural language processing (NLP), and another can be trained, fine-tuned, or well-suited for generation of structured language data queries.

During operation, the first LLM 1302 receives, as input (e.g., prompt input), a first set of instructions 1306, a natural language request 1310 received from a user, and first context data 1312. For some embodiments, the first set of instructions 1306 is specifically configured for the first LLM 1302. The first set of instructions 1306 can facilitate performance of a specific operation or functionality by the first LLM 1302, where the specific operation/functionality can comprise generating a structured language data query 1318 (e.g., SQL) based on the first context data 1312 and the natural language request 1310. The first LLM 1302 can also be fine-tuned to protect against harmful user natural language requests and harmful user responses. For some embodiments, the first context data 1312 is determined specifically to facilitate or support the operation/functionality of the first LLM 1302.

During operation, the second LLM 1304 receives, as input (e.g., prompt input), a second set of instructions 1308, the natural language request 1310 received from a user, second context data 1314, and the structured language data query 1318 generated (as output) by the first LLM 1302. For some embodiments, the second set of instructions 1308 is specifically configured for the second LLM 1304. The second set of instructions 1308 can facilitate performance of a specific operation or functionality by the second LLM 1304, where the specific operation/functionality can comprise generating a response 1316, where the response 1316 can comprise the structured language data query 1318 (e.g., SQL) and a natural language explanation of the structured language data query 1318. For some embodiments, the second context data 1314 is determined specifically to facilitate or support the operation/functionality of the first LLM 1302.

As noted herein, FIG. 13 represents an example implementation of a chain of large language models. The configuration of the chain of large language models for other embodiments can differ from that of the chain of large language models 1300. For instance, though not illustrated in FIG. 13, the chain of large language models can have one or more additional LLMs that are operably coupled to the beginning of the chain of large language models and that classify a user's intent and generate a first set of instructions for the first LLM 1302, a second set of instructions for the second LLM 1304, or a common set of instructions for the first LLM 1302 and the second LLM 1304 based on the classified user's intent. Additionally, or alternatively, the chain of large language models can have one or more additional LLMs that are operably coupled to the beginning of the chain of large language models and that identify whether a user's natural language request (e.g., natural language question) is malicious (and, if malicious, cause the chain of large language models and/or the AI-based assistant to decline to respond to the natural language request).

Figure 14:
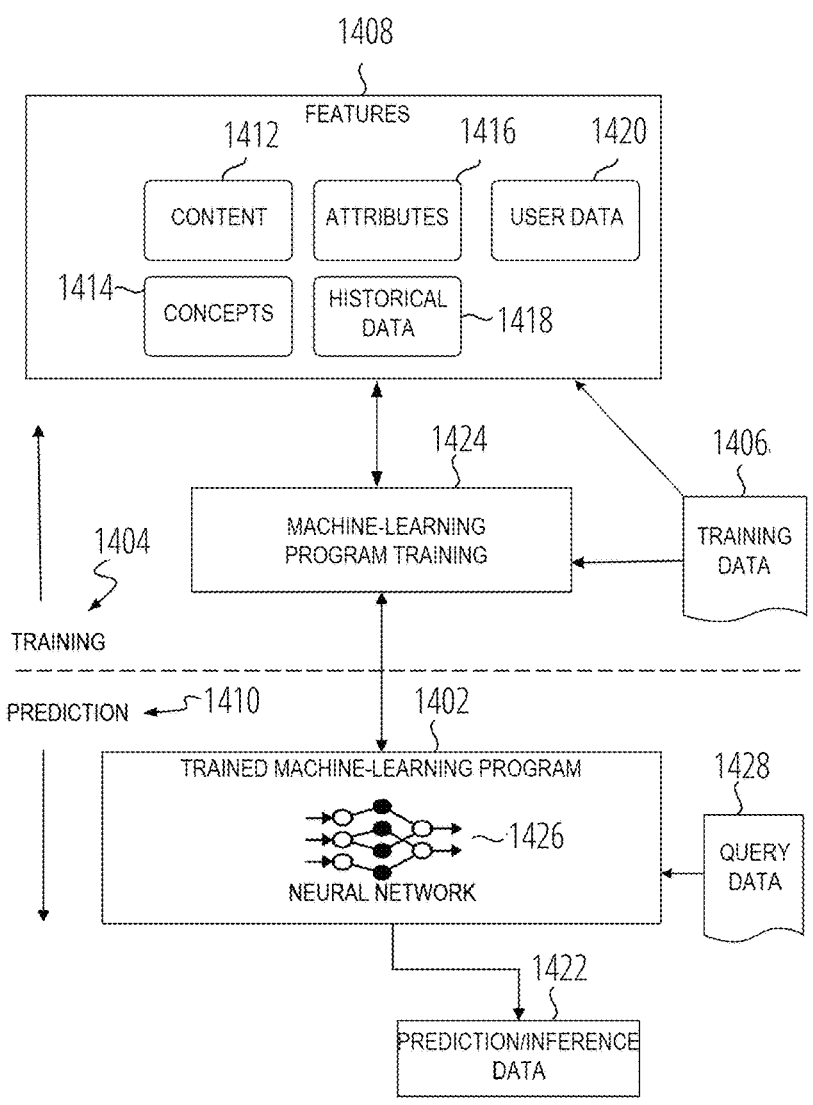
FIG. 14 illustrates training and use of a machine-learning program, in accordance with some example embodiments.

FIG. 14 illustrates further details of two example phases, namely a training phase 1404 (e.g., part of the model selection and training 1506) and a prediction phase 1410 (part of prediction 1510). Prior to the training phase 1404, feature engineering 1504 is used to identify features 1408. This may include identifying informative, discriminating, and independent features for effectively operating the trained machine-learning program 1402 in pattern recognition, classification, and regression. In some examples, the training data 1406 includes labeled data, known for pre-identified features 1408 and one or more outcomes. Each of the features 1408 may be a variable or attribute, such as an individual measurable property of a process, article, system, or phenomenon represented by a data set (e.g., the training data 1406). Features 1408 may also be of different types, such as numeric features, strings, and graphs, and may include one or more of content 1412, concepts 1414, attributes 1416, historical data 1418, and/or user data 1420, merely for example.

In training phase 1404, the machine-learning pipeline 1400 uses the training data 1406 to find correlations among the features 1408 that affect a predicted outcome or prediction/inference data 1422.

With the training data 1406 and the identified features 1408, the trained machine-learning program 1402 is trained during the training phase 1404 during machine-learning program training 1424. The machine-learning program training 1424 appraises values of the features 1408 as they correlate to the training data 1406. The result of the training is the trained machine-learning program 1402 (e.g., a trained or learned model).

Further, the training phase 1404 may involve machine learning, in which the training data 1406 is structured (e.g., labeled during preprocessing operations). The trained machine-learning program 1402 implements a neural network 1426 capable of performing, for example, classification and clustering operations. In other examples, the training phase 1404 may involve deep learning, in which the training data 1406 is unstructured, and the trained machine-learning program 1402 implements a deep neural network 1426 that can perform both feature extraction and classification/clustering operations.

In some examples, a neural network 1426 may be generated during the training phase 1404 and implemented within the trained machine-learning program 1402. The neural network 1426 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 1426 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 1426 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1404, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 1410, the trained machine-learning program 1402 uses the features 1408 for analyzing query data 1428 to generate inferences, outcomes, or predictions, as examples of a prediction/inference data 1422. For example, during prediction phase 1410, the trained machine-learning program 1402 generates an output. Query data 1428 is provided as an input to the trained machine-learning program 1402, and the trained machine-learning program 1402 generates the prediction/inference data 1422 as output, responsive to receipt of the query data 1428.

In some examples, the trained machine-learning program 1402 may be a generative AI model. Generative AI is a term that may refer to any type of artificial intelligence that can create new content from training data 1406. For example, generative AI can produce text, images, video, audio, code, or synthetic data similar to the original data but not identical.

Some of the techniques that may be used in generative AI are: Convolutional Neural Networks, Recurrent Neural Networks, generative adversarial networks, variational autoencoders, transformer models, and the like.

For example, Convolutional Neural Networks (CNNs) can be used for image recognition and computer vision tasks. CNNs may, for example, be designed to extract features from images by using filters or kernels that scan the input image and highlight important patterns. Recurrent Neural Networks (RNNs) can be used for processing sequential data, such as speech, text, and time series data, for example. RNNs employ feedback loops that allow them to capture temporal dependencies and remember past inputs. Generative adversarial networks (GANs) can include two neural networks: a generator and a discriminator. The generator network attempts to create realistic content that can "fool" the discriminator network, while the discriminator network attempts to distinguish between real and fake content. The generator and discriminator networks compete with each other and improve over time. Variational autoencoders (VAEs) can encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies. Transformer models can use attention mechanisms to learn the relationships between different parts of input data (such as words or pixels) and generate output data based on these relationships. Transformer models can handle sequential data, such as text or speech, as well as non-sequential data, such as images or code. In generative AI examples, the output prediction/inference data 1422 can include predictions, translations, summaries, media content, and the like, or some combination thereof.

In some example embodiments, computer-readable files come in several varieties, including unstructured files, semi-structured files, and structured files. These terms may mean different things to different people. Examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data.

As used herein, examples of unstructured files include image files, video files, PDFs, audio files, and the like; examples of semi-structured files include JavaScript Object Notation (JSON) files, extensible Markup Language (XML) files, and the like. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a cloud data platform 102 can include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A cloud data platform 102 may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a cloud data platform 102, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

In the present disclosure, physical units of data that are stored in a cloud data platform—and that make up the content of, e.g., database tables in customer accounts (e.g., customer users)—are referred to as micro-partitions. In different implementations, a cloud data platform can store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the cloud data platform, a given file is referred to herein as an "internal file" and may be stored in (or at, or on, etc.) what is referred to herein as an "internal storage location." If stored external to the cloud data platform, a given file is referred to herein as an "external file" and is referred to as being stored in (or at, or on, etc.) what is referred to herein as an "external storage location."

While example embodiments of the present disclosure reference commands in the standardized syntax of the programming language Structured Query Language (SQL), it will be understood by one having ordinary skill in the art that the present disclosure can similarly apply to other programming languages associated with communicating and retrieving data from a database.

FIG. 15 depicts a machine-learning pipeline 1500 and FIG. 15 illustrates training and use of a machine-learning program (e.g., model) 1400. Specifically, FIG. 15 is a flowchart depicting a machine-learning pipeline 1500, according to some examples. The machine-learning pipeline 1500 can be used to generate a trained model, for example the trained machine-learning program 1402 of FIG. 14, to perform operations associated with searches and query responses.

Broadly, machine learning may involve using computer algorithms to automatically learn patterns and relationships in data, potentially without the need for explicit programming. Machine learning algorithms can be divided into three main categories: supervised learning, unsupervised learning, self-supervised, and reinforcement learning.

For example, supervised learning involves training a model using labeled data to predict an output for new, unseen inputs. Examples of supervised learning algorithms include linear regression, decision trees, and neural networks. Unsupervised learning involves training a model on unlabeled data to find hidden patterns and relationships in the data. Examples of unsupervised learning algorithms include clustering, principal component analysis, and generative models like autoencoders. Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions.

Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (e.g., is this object an apple or an orange?). Regression algorithms aim at quantifying some items (for example, by providing a value that is a real number).

Turning to the training phases 1404 as described and depicted in connection with FIG. 15, generating a trained machine-learning program 1402 may include multiple phases that form part of the machine-learning pipeline 1500, including for example the following phases illustrated in FIG. 15: data collection and preprocessing 1502, feature engineering 1504, model selection and training 1506, model evaluation 1508, prediction 1510, validation, refinement, or retraining 1512, and deployment 1514, or a combination thereof.

For example, data collection and preprocessing 1502 can include a phase for acquiring and cleaning data to ensure that it is suitable for use in the machine learning model. This phase may also include removing duplicates, handling missing values, and converting data into a suitable format. Feature engineering 1504 can include a phase for selecting and transforming the training data 1406 to create features that are useful for predicting the target variable. Feature engineering may include (1) receiving features 1408 (e.g., as structured or labeled data in supervised learning) and/or (2) identifying features 1408 (e.g., unstructured, or unlabeled data for unsupervised learning) in training data 1406. Model selection and training 1506 can include a phase for selecting an appropriate machine learning algorithm and training it on the preprocessed data. This phase may further involve splitting the data into training and testing sets, using cross-validation to evaluate the model, and tuning hyperparameters to improve performance.

In additional examples, model evaluation 1508 can include a phase for evaluating the performance of a trained model (e.g., the trained machine-learning program 1402) on a separate testing dataset. This phase can help determine if the model is overfitting or underfitting and determine whether the model is suitable for deployment. Prediction 1510 can include a phase for using a trained model (e.g., trained machine-learning program 1402) to generate predictions on new, unseen data. Validation, refinement or retraining 1512 can include a phase for updating a model based on feedback generated from the prediction phase, such as new data or user feedback. Deployment 1514 can include a phase for integrating the trained model (e.g., the trained machine-learning program 1402) into a more extensive system or application, such as a web service, mobile app, or IoT device. This phase can involve setting up APIs, building a user interface, and ensuring that the model is scalable and can handle large volumes of data.

In view of the disclosure above, various examples are set forth below. It should be noted that one or more features of an example, taken in isolation or combination, should be considered within the disclosure of this application.

Example 1 is a system comprising: at least one hardware processor; and at least one memory storing instructions that cause the at least one hardware processor to perform operations comprising: generating textual representations of data files by parsing and categorizing text of the data files; causing display of a chat message within a user interface configured to receive prompts from a first user; receiving a plurality of prompts from the first user via the user interface, the plurality of prompts comprising a first query; generating a modified first query based on the plurality of prompts; identifying relevant portions of the textual representations based on the modified first query; generating a retrieval-augmented generation (RAG) context block based on the relevant portions of the textual representations; inputting the RAG context block into a prompt response machine learning model to generate a response to the first query, the prompt response machine learning model trained to generate responses to queries based on inputted RAG context blocks; and causing display of the response to the first query to the first user within the user interface.

In Example 2, the subject matter of Example 1 includes, wherein generating the modified first query comprises applying the plurality of prompts to a query modifier machine learning model to generate the modified first query, the query modifier machine learning model being trained to receive as input multiple prompts and generate a modified prompt.

In Example 3, the subject matter of Example 2 includes, wherein the first query is derived from the latest prompt, wherein the query modifier machine learning model is trained to modify the latest query of the multiple prompts.

In Example 4, the subject matter of Example 3 includes, wherein accessing the modified first query to receive relevant portions of the textual representations comprises inputting the modified first query into a document retrieval machine learning model, the document retrieval machine learning model trained to identify portions of textual representations of documents that are relevant to inputted queries.

In Example 5, the subject matter of Examples 2-4 includes, wherein the query modifier machine learning model comprises a natural language processing machine learning model trained to parse and interpret a meaning from each prompt and synthesize information interpreted from the prompts by merging the interpretations from individual prompts into the modified first query.

In Example 6, the subject matter of Examples 2-5 includes, wherein the query modifier machine learning model is configured to perform multi-turn assessment of prompts by receiving and assessing a certain number of prompts to understand context for the latest prompt, and apply the context when generating the modified query.

In Example 7, the subject matter of Example 6 includes, wherein the operations further comprise dynamically changing the number of prompts for the multi-turn assessment based on an assessment of context relevance between the latest prompt and prior prompts.

In Example 8, the subject matter of Examples 2-7 includes, wherein the query modifier machine learning model applies a weighting to each of the plurality of prompts, the weighting enabling higher consideration to more recent prompts when generating the modified first query.

In Example 9, the subject matter of Examples 2-8 includes, wherein a maximum number of turns is applied to a number of the plurality of prompts to be inputted into the query modifier machine learning model to generate the modified first query.

In Example 10, the subject matter of Examples 1-9 includes, wherein the modified first query comprises a concatenation of the plurality of prompts, wherein accessing the modified first query to receive relevant portions of the textual representations comprises inputting the modified first query into a document retrieval machine learning model, the document retrieval machine learning model trained to identify portions of textual representations of documents that are relevant to inputted queries.

In Example 11, the subject matter of Examples 1-10 includes, wherein the operations further comprise: categorizing the plurality of prompts into at least two categories, wherein prompts of a first category are directly responded to via an LLM, wherein prompts of a second category proceed with the generation of RAG context blocks and applying the prompt response machine learning model to the RAG context blocks in order to display a response to the prompt.

In Example 12, the subject matter of Examples 1-11 includes, wherein the operations further comprise merging certain textual representations of the data files into multiple data structures, and the generation of the RAG context block is based on the data structures.

In Example 13, the subject matter of Example 12 includes, wherein the data structures comprise a tree structure, wherein the operations further comprise identifying a structure of individual data files and generating the tree structure based on the structure of the individual data file, the tree structure for the data files being used in the generation of the RAG context block.

In Example 14, the subject matter of Examples 1-13 includes, wherein the RAG context block comprises merged chunks of the textual representations of the data files and associations to source data files corresponding to each individual textual representation, the prompt response machine learning model configured to process the textual representations and associations to the original data files to generate responses to the queries.

In Example 15, the subject matter of Examples 1-14 includes, wherein the generation of the RAG context block comprises identifying a token budget for the prompt response machine learning model, and adjusting the RAG context block in order to meet the token budget for the prompt response machine learning model, wherein adjusting the contents of the RAG context block comprises changing a citation corresponding to an address for the data file to a source identifier.

In Example 16, the subject matter of Examples 1-15 includes, wherein to generate the modified first query comprises creating sub-queries from the first query identified in the plurality of prompts, wherein assessing the modified first query to identify relevant portions of the textual representations comprises identifying relevant portion of the textual representations each of the sub-queries.

In Example 17, the subject matter of Example 16 includes, wherein the sub-queries are processed in parallel to identify relevant portions for each of the sub-queries, the operations further comprise processing each of the relevant portions for each of the sub-queries via a large language model (LLM) to generate an overall relevant portion of the textual representations, the overall relevant portion used to generate the RAG context block.

In Example 18, the subject matter of Examples 1-17 includes, wherein the prompt response machine learning model determines whether the received RAG context block is sufficient to generate the response to the first query, and in response to determining that the RAG context block is insufficient, identify additional relevant portions of the textual representations, and generating the response to the first query based on the RAG context block from the relevant portions and based on the additional relevant portions of the textual representations.

Example 19 is a method performed by at least one hardware processor, the method comprising: generating textual representations of data files by parsing and categorizing text of the data files; causing display of a chat message within a user interface configured to receive prompts from a first user; receiving a plurality of prompts from the first user via the user interface, the plurality of prompts comprising a first query; generating a modified first query based on the plurality of prompts; identifying relevant portions of the textual representations based on the modified first query; generating a retrieval-augmented generation (RAG) context block based on the relevant portions of the textual representations; inputting the RAG context block into a prompt response machine learning model to generate a response to the first query, the prompt response machine learning model trained to generate responses to queries based on inputted RAG context blocks; and causing display of the response to the first query to the first user within the user interface.

Example 20 is computer-storage media comprising instructions that, when executed by one or more processors of a machine, configure the machine to perform operations comprising: generating textual representations of data files by parsing and categorizing text of the data files; causing display of a chat message within a user interface configured to receive prompts from a first user; receiving a plurality of prompts from the first user via the user interface, the plurality of prompts comprising a first query; generating a modified first query based on the plurality of prompts; identifying relevant portions of the textual representations based on the modified first query; generating a retrieval-augmented generation (RAG) context block based on the relevant portions of the textual representations; inputting the RAG context block into a prompt response machine learning model to generate a response to the first query, the prompt response machine learning model trained to generate responses to queries based on inputted RAG context blocks; and causing display of the response to the first query to the first user within the user interface.

Example 21 is a system comprising: at least one hardware processor; and at least one memory storing instructions that cause the at least one hardware processor to perform operations comprising: generating textual representations of data files by parsing and categorizing text of the data files; initiating a chat message comprising a user interface configured to receive prompts from a first user; receiving a first query from the first user via the user interface; assessing data corresponding to the first query to identify relevant portions of the textual representations; generating a retrieval-augmented generation (RAG) context block from the relevant portions of the textual representations, the RAG context block comprising data representing the relevant portions of the textual representations and an identifier corresponding to a source address of a first data file corresponding to the relevant portions; inputting the RAG context block into a prompt response machine learning model to receive a response to the first query, the prompt response machine learning model trained to generate responses to queries based on inputted RAG context blocks; inputting the RAG context block and the response to the first query into a citation machine learning model to receive a citation for the response, the citation machine learning model trained to generate citations based on inputted RAG context blocks and responses; and displaying the response to the first query and the corresponding citation to the first user.

In Example 22, the subject matter of Example 21 includes, wherein the prompt response machine learning model is trained separately using different training data than the citation machine learning model.

In Example 23, the subject matter of Examples 21-22 includes, wherein the citation that is displayed to the user comprises a simplified version of the address for the corresponding data file.

In Example 24, the subject matter of Example 23 includes, wherein the citation comprises a user selectable link, the operations further comprising in response to a user selection of the citation, displaying an excerpt of text from the data file that corresponds to the portion of the response associated with the citation.

In Example 25, the subject matter of Examples 21-24 includes, wherein the citation that is displayed to the user comprises an address for the corresponding data file.

In Example 26, the subject matter of Examples 21-25 includes, wherein the operations further comprise: identifying an error in the citation; and in response to identifying the error in the citation, removing the citation and a portion of the response corresponding to the error.

In Example 27, the subject matter of Examples 21-26 includes, wherein the operations further comprise: identifying an error in the citation; and in response to identifying the error in the citation: excluding the relevant portions of the textual representations corresponding to the citation in the RAG context block to generate an updated RAG context block; inputting the updated RAG context block into the prompt response machine learning model to receive an updated response; inputting the updated RAG context block into the citation machine learning model to receive an updated citation; and displaying the updated response with the updated citation to the first user.

In Example 28, the subject matter of Examples 21-27 includes, wherein the operations further comprise: identifying an error in the citation; and in response to identifying the error in the citation: reassessing the data corresponding to the first query to identify a second set of relevant portions of the textual representations; generating an updated RAG context block using the second set of relevant portions; inputting the updated RAG context block into the prompt response machine learning model to receive an updated response; inputting the updated RAG context block into the citation machine learning model to receive an updated citation; and displaying the updated response with the updated citation to the first user.

In Example 29, the subject matter of Example 28 includes, wherein reassessing the data comprises identifying the second set of relevant portions of the textual representations using the same data corresponding to the first query.

In Example 30, the subject matter of Examples 28-29 includes, wherein the operations further comprise: modifying the first query to generate updated data corresponding to the first query; wherein reassessing the data comprises reassessing the updated data to identify the second set of relevant portions of the textual representations.

In Example 31, the subject matter of Examples 21-30 includes, wherein the operations further comprise: identifying an error in the citation; and in response to identifying the error in the citation: reinputting the RAG context block and the response to the first query into the citation machine learning model to receive an updated citation for the response; and displaying the response to the first query and a corresponding updated citation to the first user.

In Example 32, the subject matter of Examples 21-31 includes, wherein the inputting of the RAG context block and the response into the citation machine learning model is performed subsequent to the response being fully generated by the prompt response machine learning model.

In Example 33, the subject matter of Examples 21-32 includes, wherein the inputting of the RAG context block and the response into the citation machine learning model is performed simultaneously as the response is being generated by the prompt response machine learning model, wherein the operations further comprise: receiving a first portion of the response from the prompt response machine learning model; inputting the RAG context block and the first portion of the response to the citation machine learning model to receive a first citation; and displaying the first portion of the response and the first citation to the first user.

In Example 34, the subject matter of Example 33 includes, wherein the operations further comprise: receiving a second portion of the response from the prompt response machine learning model; inputting the RAG context block, the first portion, and the second portion of the response to the citation machine learning model to receive a second citation; and displaying the first portion of the response, the second portion of the response, and the second citation to the first user.

In Example 35, the subject matter of Examples 21-34 includes, wherein the citation machine learning model is trained to infer a source data file that supports the response, wherein the response does not comprise word-for-word excerpts from the data file.

In Example 36, the subject matter of Examples 21-35 includes, wherein the operations further comprise: transmitting the citation from the citation machine learning model to the prompt response machine learning model for the prompt response machine learning model to add the citation to the response.

Example 37 is a method comprising: generating textual representations of data files by parsing and categorizing text of the data files; initiating a chat message comprising a user interface configured to receive prompts from a first user; receiving a first query from the first user via the user interface; assessing data corresponding to the first query to identify relevant portions of the textual representations; generating a retrieval-augmented generation (RAG) context block from the relevant portions of the textual representations, the RAG context block comprising data representing the relevant portions of the textual representations and an identifier corresponding to a source address of a first data file corresponding to the relevant portions; inputting the RAG context block into a prompt response machine learning model to receive a response to the first query, the prompt response machine learning model trained to generate responses to queries based on inputted RAG context blocks; inputting the RAG context block and the response to the first query into a citation machine learning model to receive a citation for the response, the citation machine learning model trained to generate citations based on inputted RAG context blocks and responses; and displaying the response to the first query and the corresponding citation to the first user.

Example 38 is computer-storage media comprising instructions that, when executed by one or more processors of a machine, configure the machine to perform operations comprising: generating textual representations of data files by parsing and categorizing text of the data files; initiating a chat message comprising a user interface configured to receive prompts from a first user; receiving a first query from the first user via the user interface; assessing data corresponding to the first query to identify relevant portions of the textual representations; generating a retrieval-augmented generation (RAG) context block from the relevant portions of the textual representations, the RAG context block comprising data representing the relevant portions of the textual representations and an identifier corresponding to a source address of a first data file corresponding to the relevant portions; inputting the RAG context block into a prompt response machine learning model to receive a response to the first query, the prompt response machine learning model trained to generate responses to queries based on inputted RAG context blocks; inputting the RAG context block and the response to the first query into a citation machine learning model to receive a citation for the response, the citation machine learning model trained to generate citations based on inputted RAG context blocks and responses; and displaying the response to the first query and the corresponding citation to the first user.

Example 39 is at least one machine-readable medium including instructions that, when executed by processing circuitry, cause the processing circuitry to perform operations to implement any of Examples 1-38.

Example 40 is an apparatus comprising means to implement any of Examples 1-38.

Example 41 is a system to implement any of Examples 1-38.

Example 42 is a method to implement any of Examples 1-38.

Figure 16:
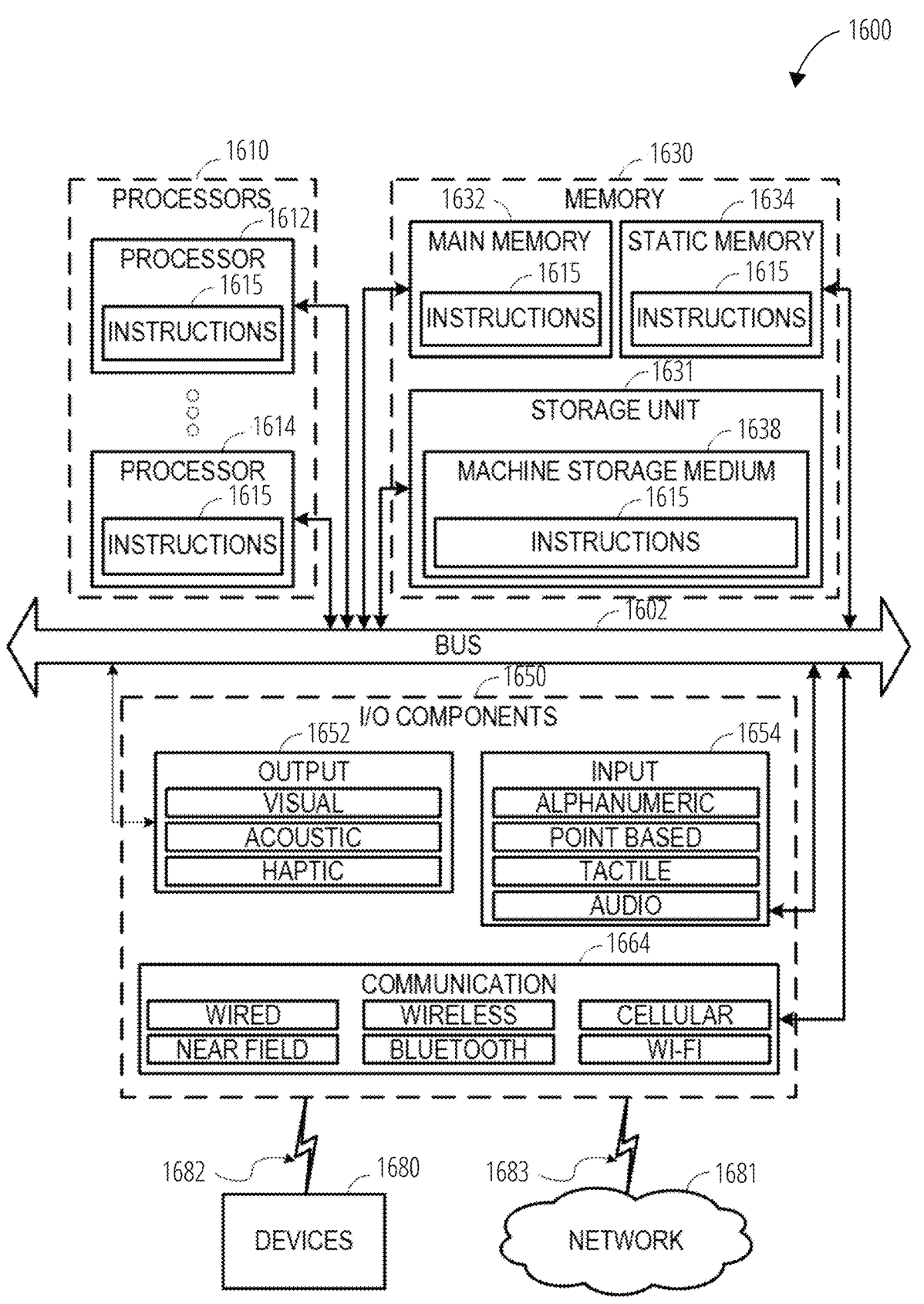
FIG. 16 illustrates a diagrammatic representation of a machine in the form of a computer system within which a set of instructions may be executed for causing the machine to perform any one or more of the methodologies discussed herein, in accordance with some embodiments of the present disclosure.

FIG. 16 illustrates a diagrammatic representation of a machine 1600 in the form of a computer system within which a set of instructions may be executed for causing the machine 1600 to perform any one or more of the methodologies discussed herein, according to an example embodiment. Specifically, FIG. 16 shows a diagrammatic representation of the machine 1600 in the example form of a computer system, within which instructions 1615 (e.g., software, a program, an application, an applet, an app, or other executable code), for causing the machine 1600 to perform any one or more of the methodologies discussed herein, may be executed. For example, the instructions 1615 may cause the machine 1600 to implement portions of the data flows described herein (e.g., data flows described and depicted in FIG. 8). In this way, the instructions 1615 transform a general, non-programmed machine into a particular machine 1600 (e.g., the client device 112 of FIG. 1, the compute service manager 108 of FIG. 1, the execution platform 110 of FIG. 1) that is specially configured to carry out any one of the described and illustrated functions in the manner described herein.

In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1615, sequentially or otherwise, that specify actions to be taken by the machine 1600. Further, while only a single machine 1600 is illustrated, the term "machine" shall also be taken to include a collection of machines 1600 that individually or jointly execute the instructions 1615 to perform any one or more of the methodologies discussed herein.

The machine 1600 includes processors 1610 (such as processor 1612 and processor 1614), memory 1630, and input/output (I/O) I/O components 1650 (including output components 1652 and input components 1654) configured to communicate with each other such as via a bus 1602. In an example embodiment, the processors 1610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1612 and a processor 1614 that may execute the instructions 1615. The term "processor" is intended to include multi-core processors 1610 that may comprise two or more independent processors (sometimes referred to as "cores") that may execute instructions 1615 contemporaneously. Although FIG. 16 shows multiple processors 1610, the machine 1600 may include a single processor with a single core, a single processor with multiple cores (e.g., a multi-core processor), multiple processors with a single core, multiple processors with multiple cores, or any combination thereof.

The memory 1630 may include a main memory 1632, a static memory 1634, and a storage unit 1631, all accessible to the processors 1610 such as via the bus 1602. The main memory 1632, the static memory 1634, and the storage unit 1631 comprise a machine storage medium 1638 that may store the instructions 1615 embodying any one or more of the methodologies or functions described herein. The instructions 1615 may also reside, completely or partially, within the main memory 1632, within the static memory 1634, within the storage unit 1631, within at least one of the processors 1610 (e.g., within the processor's cache memory), or any suitable combination thereof, during execution thereof by the machine 1600.

The I/O components 1650 include components to receive input, provide output, produce output, transmit information, exchange information, capture measurements, and so on. The specific I/O components 1650 that are included in a particular machine 1600 will depend on the type of machine. For example, portable machines, such as mobile phones, will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1650 may include communication components 1664 operable to couple the machine 800 to a network 1681 via a coupler 1683 or to devices 1680 via a coupling 1682. For example, the communication components 1664 may include a network interface component or another suitable device to interface with the network 1681. In further examples, the communication components 1664 may include wired communication components, wireless communication components, cellular communication components, and other communication components to provide communication via other modalities. The devices 1680 may be another machine or any of a wide variety of peripheral devices (e.g., a peripheral device coupled via a universal serial bus (USB)). For example, as noted above, the machine 1600 may correspond to any one of the client device 112, the compute service manager 108, and the execution platform 110, and may include any other of these systems and devices.

The various memories (e.g., 1630, 1632, 1634, and/or memory of the processor(s) 1610 and/or the storage unit 1631) may store one or more sets of instructions 1615 and data structures (e.g., software), embodying or utilized by any one or more of the methodologies or functions described herein. These instructions 1615, when executed by the processor(s) 1610, cause various operations to implement the disclosed embodiments.

Another general aspect is for a system that includes a memory comprising instructions and one or more computer processors or one or more hardware processors. The instructions, when executed by the one or more computer processors, cause the one or more computer processors to perform operations. In yet another general aspect, a tangible machine-readable storage medium (e.g., a non-transitory storage medium) includes instructions that, when executed by a machine, cause the machine to perform operations.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, (e.g., erasable programmable read-only memory (EPROM), electrically erasable programmable read-only memory (EEPROM), field-programmable gate arrays (FPGAs), and flash memory devices); magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1681 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1681 or a portion of the network 1681 may include a wireless or cellular network, and the coupling 1682 may be a Code Division Multiple Access (CDMA) connection, a Global System for Mobile communications (GSM) connection, or another type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1615 may be transmitted or received over the network 1681 using a transmission medium via a network interface device (e.g., a network interface component included in the communication components 1664) and utilizing any one of a number of well-known transfer protocols (e.g., hypertext transfer protocol (HTTP)). Similarly, the instructions 1615 may be transmitted or received using a transmission medium via the coupling 1682 (e.g., a peer-to-peer coupling) to the devices 1680. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1615 for execution by the machine 1600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:

at least one hardware processor; and at least one memory storing instructions that cause the at least one hardware processor to perform operations comprising:

generating textual representations of data files by parsing and categorizing text of the data files;

causing display of a chat message within a user interface configured to receive prompts from a first user;

receiving a plurality of prompts from the first user via the user interface, the plurality of prompts comprising a first query;

generating a modified first query based on the plurality of prompts;

identifying relevant portions of the textual representations based on the modified first query;

generating a retrieval-augmented generation (RAG) context block based on the relevant portions of the textual representations;

inputting the RAG context block into a prompt response machine learning model to generate a response to the first query, the prompt response machine learning model being trained to generate responses to queries based on inputted RAG context blocks; and causing display of the response to the first query to the first user within the user interface.

2. The system of claim 1, wherein generating the modified first query comprises applying the plurality of prompts to a query modifier machine learning model to generate the modified first query, the query modifier machine learning model being trained to receive as input multiple prompts and generate a modified prompt.

3. The system of claim 2, wherein the first query is derived from a latest prompt, wherein the query modifier machine learning model is trained to modify a latest query of the multiple prompts.

4. The system of claim 3, wherein accessing the modified first query to receive relevant portions of the textual representations comprises inputting the modified first query into a document retrieval machine learning model, the document retrieval machine learning model being trained to identify portions of textual representations of documents that are relevant to inputted queries.

5. The system of claim 2, wherein the query modifier machine learning model comprises a natural language processing machine learning model trained to parse and interpret a meaning from each prompt and synthesize information interpreted from the prompts by merging the interpretations from individual prompts into the modified first query.

6. The system of claim 2, wherein the query modifier machine learning model is configured to perform multi-turn assessment of prompts by receiving and assessing a certain number of prompts to understand context for a latest prompt, and apply the context when generating the modified query.

7. The system of claim 6, wherein the operations further comprise dynamically changing the certain number of prompts for the multi-turn assessment based on an assessment of context relevance between the latest prompt and prior prompts.

8. The system of claim 2, wherein the query modifier machine learning model applies a weighting to each of the plurality of prompts, the weighting enabling higher consideration to more recent prompts when generating the modified first query.

9. The system of claim 2, wherein a maximum number of turns is applied to a number of the plurality of prompts to be inputted into the query modifier machine learning model to generate the modified first query.

10. The system of claim 1, wherein the modified first query comprises a concatenation of the plurality of prompts, wherein accessing the modified first query to receive relevant portions of the textual representations comprises inputting the modified first query into a document retrieval machine learning model, the document retrieval machine learning model being trained to identify portions of textual representations of documents that are relevant to inputted queries.

11. The system of claim 1, wherein the operations further comprise:

categorizing the plurality of prompts into at least two categories, wherein prompts of a first category are directly responded to via an LLM, wherein prompts of a second category proceed with the generation of RAG context blocks and applying the prompt response machine learning model to the RAG context blocks in order to display a response to the prompts.

12. The system of claim 1, wherein the operations further comprise merging certain textual representations of the data files into multiple data structures, and the generation of the RAG context block is based on the multiple data structures.

13. The system of claim 12, wherein the multiple data structures comprise a tree structure, wherein the operations further comprise identifying a structure of individual data files and generating the tree structure based on the structure of the individual data files, the tree structure for the data files being used in the generation of the RAG context block.

14. The system of claim 1, wherein the RAG context block comprises merged chunks of the textual representations of the data files and associations to source data files corresponding to each individual textual representation, the prompt response machine learning model configured to process the textual representations and associations to original data files to generate responses to the queries.

15. The system of claim 1, wherein the generation of the RAG context block comprises identifying a token budget for the prompt response machine learning model, and adjusting the RAG context block in order to meet the token budget for the prompt response machine learning model, wherein adjusting contents of the RAG context block comprises changing a citation corresponding to an address for a data file to a source identifier.

16. The system of claim 1, wherein to generate the modified first query comprises creating sub-queries from the first query identified in the plurality of prompts, wherein assessing the modified first query to identify relevant portions of the textual representations comprises identifying relevant portion of the textual representations each of the sub-queries.

17. The system of claim 16, wherein the sub-queries are processed in parallel to identify relevant portions for each of the sub-queries, the operations further comprise processing each of the relevant portions for each of the sub-queries via a large language model (LLM) to generate an overall relevant portion of the textual representations, the overall relevant portion used to generate the RAG context block.

18. The system of claim 1, wherein the prompt response machine learning model determines whether the received RAG context block is sufficient to generate the response to the first query, and in response to determining that the RAG context block is insufficient, identify additional relevant portions of the textual representations, and generating the response to the first query based on the RAG context block from the relevant portions and based on the additional relevant portions of the textual representations.

19. A method performed by at least one hardware processor, the method comprising:

generating textual representations of data files by parsing and categorizing text of the data files;

causing display of a chat message within a user interface configured to receive prompts from a first user;

receiving a plurality of prompts from the first user via the user interface, the plurality of prompts comprising a first query;

generating a modified first query based on the plurality of prompts;

identifying relevant portions of the textual representations based on the modified first query;

generating a retrieval-augmented generation (RAG) context block based on the relevant portions of the textual representations;

inputting the RAG context block into a prompt response machine learning model to generate a response to the first query, the prompt response machine learning model being trained to generate responses to queries based on inputted RAG context blocks; and causing display of the response to the first query to the first user within the user interface.

20. Computer-storage medium comprising instructions that, when executed by one or more processors of a machine, configure the machine to perform operations comprising:

generating textual representations of data files by parsing and categorizing text of the data files;

causing display of a chat message within a user interface configured to receive prompts from a first user;

receiving a plurality of prompts from the first user via the user interface, the plurality of prompts comprising a first query;

generating a modified first query based on the plurality of prompts;

identifying relevant portions of the textual representations based on the modified first query;

generating a retrieval-augmented generation (RAG) context block based on the relevant portions of the textual representations;

inputting the RAG context block into a prompt response machine learning model to generate a response to the first query, the prompt response machine learning model being trained to generate responses to queries based on inputted RAG context blocks; and causing display of the response to the first query to the first user within the user interface.

\* \* \* \* \*